US012743707B2

(12) United States Patent
Gelke et al.

(10) Patent No.: US 12,743,707 B2
(45) Date of Patent: Sep. 22, 2026

(54) AI-ENABLED FRAUD ANALYSIS

(71) Applicant: KPMG International Services Ltd, London (GB)

(72) Inventors: Jan Gelke, Berlin (DE); Jon Gray, London (GB); Sebastian Stockle, Berlin (DE); Dennis Triepke, Berlin (DE)

(73) Assignee: KPMG International Services Ltd., London (GB)

( * ) Notice: Subject to any disclaimer, the term of this patent is extended or adjusted under 35 U.S.C. 154(b) by 72 days.

(21) Appl. No.: 19/014,409

(22) Filed: Jan. 9, 2025

(65) Prior Publication Data

US 2025/0259186 A1 Aug. 14, 2025

Related U.S. Application Data

(60) Provisional application No. 63/619,360, filed on Jan. 10, 2024.

(51) Int. Cl.
*G06Q 30/00* (2023.01)
*G06Q 30/018* (2023.01)
*G06N 20/00* (2019.01)

(52) U.S. Cl.
CPC ......... *G06Q 30/0185* (2013.01); *G06N 20/00* (2019.01)

(58) Field of Classification Search
CPC . G06Q 30/0185; G06Q 10/0635; G06N 20/00
USPC ........................................................... 705/30
See application file for complete search history.

(56) References Cited

U.S. PATENT DOCUMENTS

2007/0136115 A1* 6/2007 Senturk Doganaksoy ................. G06Q 10/04 705/35
2007/0226099 A1* 9/2007 Senturk-Doganaksoy ................. G06F 17/18 705/35
2010/0205076 A1* 8/2010 Parson .................. G06Q 40/02 707/804
2016/0125542 A1* 5/2016 Goldin .................. G06Q 40/06 705/36 R

* cited by examiner

*Primary Examiner* — Rokib Masud

(57) ABSTRACT

Methods, apparatus, and computer program products described herein provide for calculation of a score representative of the risk of fraud by a target entity. A set of financial ratios, lens model scores, risk area scores, and academic scores are all calculated in relation to the target entity and a group of peer entities. These calculated scores are all indicative of the risk of fraud by the target entity. The calculated scores and other market data related to the target entity are displayed to a user to evaluate the risk of fraud by the target entity.

16 Claims, 19 Drawing Sheets

Go to UP Lens Model

Go to UP Lens Model

2

3

| Financial Areas | Underperformance | Overperformance | Financial Area Inconsistency |
|---|---|---|---|
| Assets | 0.00 | 0.78 | **0.39** |
| Cash | 0.00 | 0.19 | **0.09** |
| Expenses | 0.00 | 0.41 | **0.21** |
| Liability | 0.00 | 0.05 | **0.03** |
| Revenue | 0.00 | 0.25 | **0.12** |

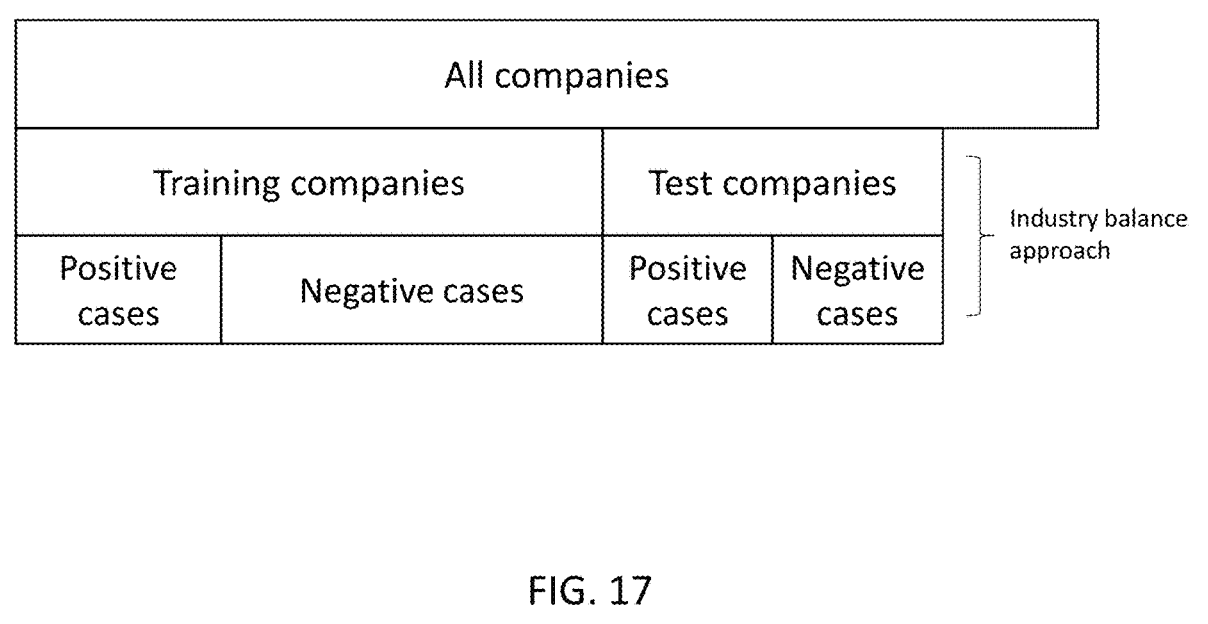

| All companies | | | |
|---|---|---|---|
| Training companies | | Test companies | |
| Positive cases | Negative cases | Positive cases | Negative cases |

Industry balance approach

FIG. 17

AI-ENABLED FRAUD ANALYSIS

CROSS-REFERENCE TO RELATED APPLICATIONS

This application claims the benefit of U.S. Provisional Application No. 63/619,360 filed Jan. 10, 2024, which is incorporated herein in its entirety.

TECHNICAL FIELD

The disclosed implementations relate generally to a quantitative approach to determining the risk of fraud by a specific company or entity and, more specifically, to systems, methods, and computer programs for creating an aggregated suite of quantitative analytics focused on identification of fraud risk indicators.

BACKGROUND OF THE INVENTION

Currently, there is no standard approach to identify potential fraud risks for a respective company or client and to determine procedures to address the audit of such risks, including the decision regarding if/where to involve more detailed forensic analysis in the audit. Often these activities include a relevant "manual" component. Similarly, there is no standard approach to identify the risk of fraud by a potential acquisition or investment target.

The lack of standard approach may cause inconsistencies and inefficiencies regarding how identification of potential fraud risks is approached across different engagements and firms. In addition, the lack of automation and data-driven solutions may prevent profiting from more advanced and insightful analysis.

SUMMARY OF THE INVENTION

The following presents a simplified summary of various aspects described herein. This summary is not an extensive overview and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

According to one aspect, a method for calculating a score representative of the risk of fraud by a target entity is performed by a computer. The method includes calculating a plurality of financial ratios for the target entity, calculating a plurality of lens model scores indicative of fraud risk for the target entity, calculating a plurality of risk area scores indicative of fraud risk for the target entity, and calculating one or more academic scores indicative of fraud risk for the target entity. The lens model scores, risk area scores, and academic scores are then displayed to a user to evaluate the overall fraud risk for the target entity.

According to another aspect, an apparatus is provided for determining the risk of fraud by a target entity. The apparatus includes one or more processors and memory that stores instructions that, when executed by the one or more processors, cause the apparatus to perform a number of steps. The apparatus includes a ratio calculation engine that calculates a plurality of financial ratios for the target entity, a lens model engine that calculates a plurality of lens model scores indicative of fraud risk for the target entity, a risk area engine that calculates a plurality of risk area scores indicative of fraud risk for the target entity, and an academic scoring engine that calculates one or more academic scores indicative of fraud risk for the target entity. The apparatus also includes, or is coupled to, a display that presents the lens model scores, risk area scores, and academic scores to a user to evaluate the overall fraud risk for the target entity.

According to a third aspect, a non-transitory machine-readable medium stores instructions that, when executed by one or more processors, cause the one or more processors to perform steps for determining the risk of fraud by a target entity. The instructions include a ratio component that causes the processors to calculate a plurality of financial ratios for the target entity, a lens model component that causes the processors to calculate a plurality of lens model scores indicative of fraud risk for the target entity, a risk area component that causes the processors to calculate a plurality of risk area scores indicative of fraud risk for the target entity, and an academic score component that causes the processors to calculate one or more academic scores indicative of fraud risk for the target entity. The instructions also cause the processors to communicate with a display device to display the lens model scores, risk area scores, and academic scores to a user to evaluate the overall fraud risk for the target entity.

BRIEF DESCRIPTION OF DRAWINGS

The present disclosure is described by way of example and not limited in the accompanying figures in which like reference numerals indicate similar elements and in which:

FIG. 12 illustrates the score breakdown of a financial area inconsistency model;

FIG. 17 is a graphic illustrating the breakdown between positive cases and negative cases in the training dataset and the testing dataset;

DETAILED DESCRIPTION OF THE INVENTION

Figure 1:
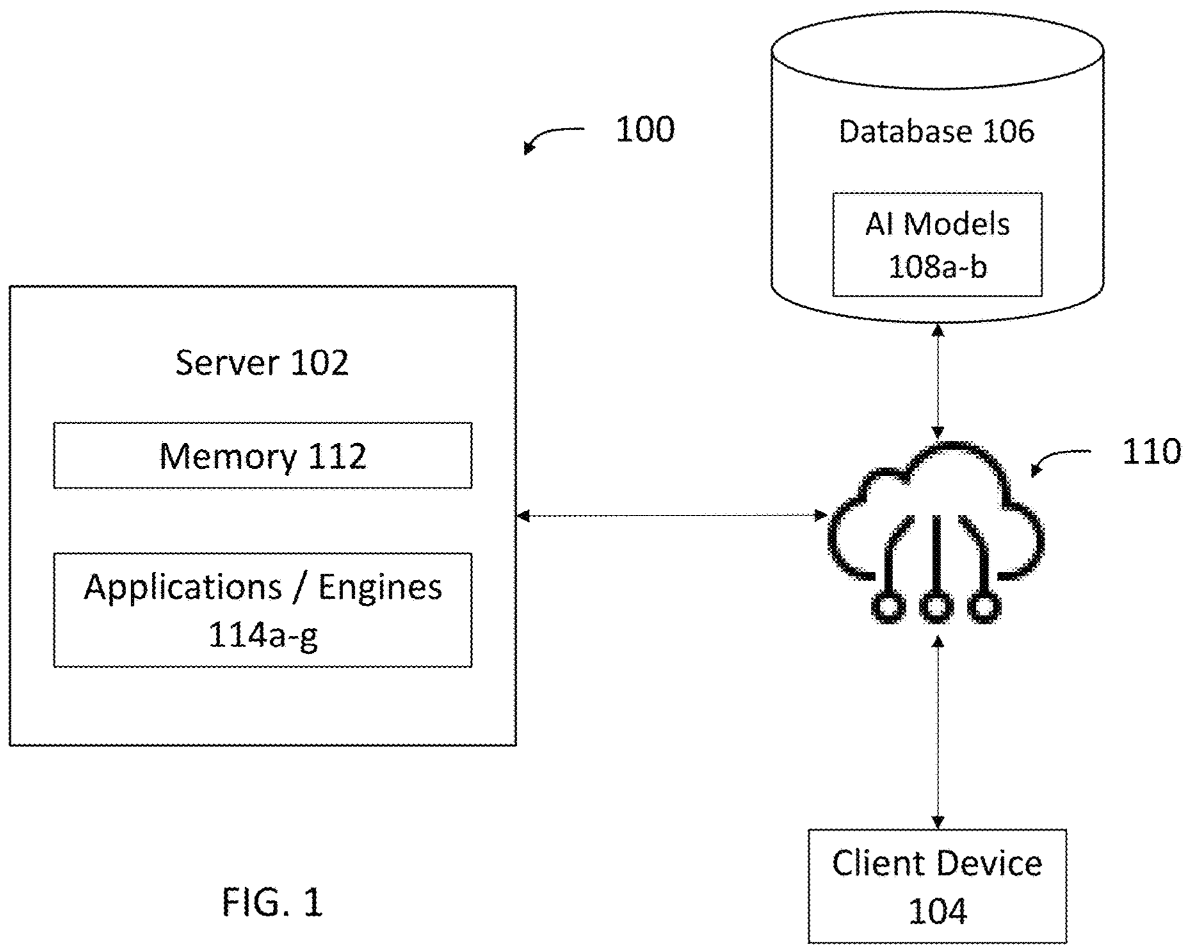
FIG. 1 is a block diagram of a system for analyzing and determining the risk of fraud by a target entity.

In the following description of embodiments of the invention, reference is made to the accompanying drawings, which show by way of illustration embodiments in which aspects of the disclosure may be practiced. Other embodiments may be used, and structural or functional modifications may be made without departing from the scope of the present disclosure. Aspects of the disclosure are capable of other embodiments and of being practiced in various ways. In addition, the terminology used in this disclosure are for the purpose of description and should not be regarded as limiting. Rather, the phrases and terms used should be given their broadest interpretation and meaning.

Known techniques for analyzing and determining the risk of fraud by a specific company or entity generally require much manual work. For example, users are required to gather the necessary data, which may differ in availability, completeness, and accuracy for different entities, and to then analyze the data using manual or mostly manual techniques. This is time consuming and subject to inaccuracies, especially when dealing with multiple datasets that are gathered from disparate sources.

The systems and methods described herein provide the ability to access multiple data sources to create an aggregated suite of quantitative analytics focused on identification of fraud risk indicators. The embodiments described herein will also result in an objective/independent perspective on the likelihood of fraud in a particular entity and could be used as an indicator to determine whether additional forensic analysis is necessary during an audit or due diligence. Artificial intelligence (AI) models can be used to generate scores that indicate potentially fraudulent financial reporting by the target entity. The AI models can be trained on data including historical data on fraudulent entities, financial statement data (e.g., balance sheets, income statements, and cash flow statements), and market performance data (e.g., credit rating, analyst recommendations, stock prices and stock price movement, and past dividends). The training data may be received in several ways including, but not limited to, from data vendors, accountants, financial institute databases, governmental databases, etc.

Embodiments of the invention thus offer several benefits. In particular, embodiments of the invention may provide indications of fraud by a target entity through automated calculations of different scores that each indicate different likelihood of fraud. Using multiple means of determining the likelihood of fraud improves the chances of avoiding interactions with the target entity (e.g., contracting with the entity, investing with the entity, acquiring the entity, or providing services to the entity). The embodiments described herein represent an improvement to an existing technology or technologies by providing specific technologies that use pretrained AI models to process a much larger amount of data, which enables analysts to review potential partners or customers with better accuracy. Thus, implementations improve the speed and accuracy with which computers can perform these analyses. Moreover, expert knowledge-based judgment of an auditor or analyst will be supported by the results to be more efficient and precise. The embodiments described herein therefore do not merely recite the performance of some business practice known from the pre-computer world along with the requirement to perform it on a computer. Rather, these embodiments incorporate one or more AI models, whether generative AI or machine learning, to enable use of new or custom data, including aggregated or synthetic comparative data. Thus, the embodiments described herein are necessarily rooted in new computer technology to overcome a problem specific to detecting the likelihood of fraudulent activity by a target entity (namely slow speed and varying accuracy due to the dependence on manual calculations and review). In addition, the present disclosure includes specific features other than what is well-understood, routine, convention activity in the field, or adding unconventional steps that confine the claim to a particular useful application, e.g., enabling further learning as feedback to enable more accurate analyses, as described herein.

FIG. 1 shows a block diagram of a system 100 for analyzing and determining the risk of fraud by a target entity. The system 100 comprises one or more servers 102, one or more client devices 104, and a database 106 that may store one or more AI models 108, interconnected via a network 110. The AI models 108 include a lens model 108*a* and a risk area model 108*b*, either or both of which could be machine learning models or large language models (i.e., generative AI models).

A memory 112 of the server 102 may host one or more applications 114. The applications 114 can include a training engine or component 114*a* that uses training data to train the AI models 108, performs missing data treatment on the data, and removes outlier data. A peer selection engine or component 114*b* is used to select peer entities for the target entity as described further below with regard to FIG. 7. A ratio calculation engine or component 114*c* is used to calculate ratio values for the target entity and peer entities. A lens model engine or component 114*d* is used to calculate lens model scores for the target entity and peer entities using AI model 108*a*. A risk area evaluation engine or component 114*e* is used to calculate risk area scores for the target entity and peer entities using AI model 108*b*. An academic calculation engine or component 114*f* is used to calculate academic scores for the target entity and peer entities, such as an Altman Z-score and an Ohlson O-score. Finally, in some embodiments, a display engine or component 114*g* is used to generate data for display by client 104, such as the aforementioned scores and market performance indicators for the target entity. Alternatively, display engine 114*g* can be instantiated within client device 104. Any other application 114 could also be instantiated within client device 104 instead or in addition to within server 102.

Applications 114 may provide instructions to server 102 allowing server 102 and client device 104 to together perform various actions. Memory 112 may include volatile and nonvolatile, removable and non-removable media implemented in any method or technology for storage of information such as computer-readable instructions, data structures, program modules, or other data. Memory 112 may include one or more physical persistent memory devices and/or one or more non-persistent memory devices.

The client device 104 may access server applications, such as applications 114, and/or resources using one or more client applications, such as a web browser or application. A client device 104 may be a mobile device, such as a laptop, smart phone, or tablet, or computing devices, such as a desktop computer or a server.

The database 106 may be configured to maintain, store, retrieve, and update information for the server 102. Further, the database 106 may provide the server 102 with information periodically or upon request. In this regard, the database 106 may be a distributed database capable of storing, maintaining, and updating large volumes of data across clusters of nodes. The database system 106 may provide a variety of databases including, but not limited to, relational databases, hierarchical databases, distributed databases, in-memory databases, flat file databases, XML databases, NoSQL databases, graph databases, and/or a combination of any of these.

Where AI modeling is used for performing scoring aspects of the embodiments, the AI models 108 may be trained to identify potential fraud by the target entity compared to the financial and other data that was used to train the AI models 108. The AI models 108 may be trained using data and/or information stored in any suitable manner, such as a data lake, local attached storage, network attached storage, or data feed via API. For example, training the AI models 108 may comprise identifying which data is connected to fraudulent operation of an entity. The data may comprise information relevant for determining whether a particular data point or set of data is indicative of fraudulent activity. Data types that can be analyzed using embodiments of the invention include historical data on fraudulent entities, financial statement data (e.g., balance sheets, income statements, and cash flow statements), and market performance data (e.g., credit rating, analyst recommendations, stock prices and stock price movement, and past dividends). For example, financial statement data can include records of revenues, expenses, profits and losses, assets and liabilities, equity, cash flow, balance sheet information, income or cashflow information, and statements on shareholder equity. Market performance data can include credit rating, analyst recommendations, stock prices and stock price movement, and past dividends, cost per sale or lead, conversion rate, customer lifetime value, average order value, customer retention information, website traffic, and so on. As more and more transactions are subsequently included in the training set, the accuracy of the AI models' classification increases. In some cases, if there is insufficient training data or the data does not include suitable information for the AI models 108, the classification of likelihood of fraud may vary, and it may not be possible to provide a high level of confidence. In other words, the likelihood of fraud related to a specific type of data may not be readily reconcilable to a specific use case or classification. In such cases, synthetic data may be used to further train the AI models 108.

The server 102 may be configured with a server application that is capable of interfacing with the client applications and the database 106. In this regard, the server 102 may be a stand-alone server, a corporate server, or a server located in a server farm or cloud-computer environment. According to some examples, the server system may be a virtual server hosted on hardware capable of supporting a plurality of virtual servers.

Regarding the network 110, it should be noted that the network connections shown are illustrative and any means of establishing a communications link between the computers may be used. The existence of any of various network protocols such as TCP/IP, Ethernet, File Transfer Protocol (FTP) or Secure FT (SFTP), HTTP and the like, and of various wireless communication technologies such as GSM, CDMA, Wi-Fi, LTE, and 5G is presumed, and the various computing devices described herein may be configured to communicate using any of these network protocols or technologies. Any of these devices and systems may be implemented, in whole or in part, using one or more computing systems described below and illustrated by FIG. 2.

Moreover, the network 110 may include any type of network. For example, the network 110 may include a local area network (LAN), a wide area network (WAN), a wireless telecommunications network, and/or any other communication network or combination. It will be appreciated that the network connections shown are illustrative and any means of establishing a communications link between the computers may be used. The existence of any of various network protocols such as TCP/IP, Ethernet, FTP, SFTP, HTTP and the like, and of various wireless communication technologies such as GSM, CDMA, Wi-Fi, LTE, and 5G, is presumed, and the various computing devices described herein may be configured to communicate using any of these network protocols or technologies.

The data transferred to and from various computing devices in system 100 may include secure and sensitive data, such as confidential documents, client personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, FTP, SFTP, and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
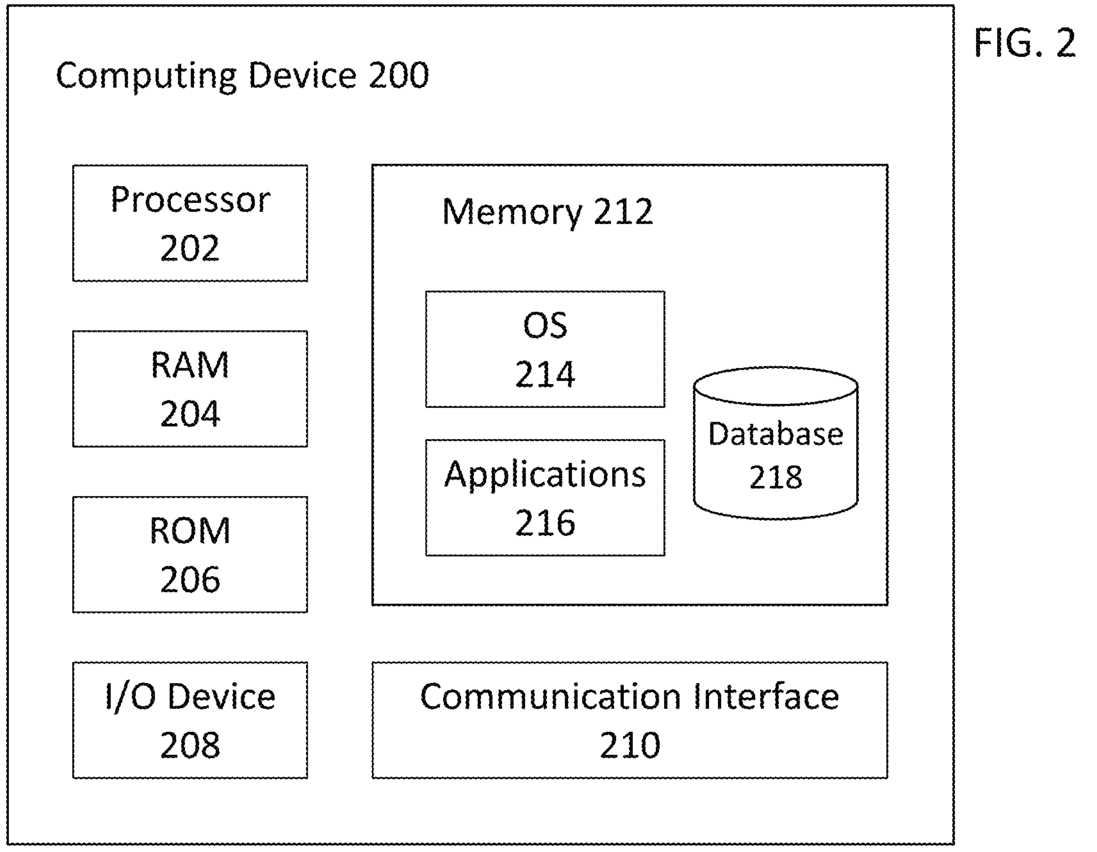
FIG. 2 is a block diagram illustrating a computing device that may be used with the server and/or the client device described in FIG. 1.

FIG. 2 is a block diagram illustrating a computing device 200 that may be used with the server 102 and/or the client device 104 described in FIG. 1. The computing device 200 may include one or more processors 202 for controlling overall operation of the computing device 200 and its associated components, including RAM 204, ROM 206, input/output device 208, communication interface 210, and/or memory 212. A data bus may interconnect processor 202, RAM 204, ROM 206, memory 212, I/O device 208, and/or communication interface 210. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

The I/O device 208 may include a microphone, keypad, touch screen, and/or stylus through which a user of the computing device 200 may provide input and may also include one or more of a speaker for providing audio output and a video display device for providing textual, audiovisual, and/or graphical output. Software may be stored within a memory 212 to provide instructions to processor 202 allowing computing device 200 to perform various actions. For example, memory 212 may store software used by the computing device 200, such as an operating system (OS) 214, applications 216, and/or an associated internal database 218. Examples of the applications 216 storable by memory 212 include applications 114*a-g* of FIG. 1, which allows client device 104, for example, to perform the methods described herein without a server-client relationship. The various hardware memory units in memory 212 may include volatile and nonvolatile, removable and non-removable media implemented in any method or technology for storage of information such as computer-readable instructions, data structures, program modules, or other data. The memory 212 may include one or more physical persistent memory devices and/or one or more non-persistent memory devices. In some embodiments, RAM 204 and/or ROM 206 may be part of the memory 212 along with electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 202.

The communication interface 210 may include one or more transceivers, digital signal processors, and/or additional circuitry and software for communicating via any network, wired or wireless, using any protocol as described above.

The processor 202 may include a single central processing unit (CPU), which may be a single-core or multi-core processor or may include multiple CPUs. Processor 202 and associated components may allow the computing device 200 to execute a series of computer-readable instructions or components to perform some or all of the processes described herein. Although not shown in FIG. 2, various elements within memory 212 or other components in computing device 200, may include one or more caches, for example, CPU caches used by the processor 202, page caches used by the OS 214, disk caches of a hard drive, and/or database caches used to cache content from the database 218. For embodiments including a CPU cache, the CPU cache may be used by one or more processors 202 to reduce memory latency and access time. A processor 202 may retrieve data from or write data to the CPU cache rather than reading/writing to memory 212, which may improve the speed of these operations. In some examples, a database cache may be created in which certain data from a database 218 is cached in a separate smaller database in a memory separate from the database, such as in RAM 204 or on a separate computing device. For instance, in a multi-tiered application, a database cache on an application server may reduce data retrieval and data manipulation time by not needing to communicate over a network with a back-end database server. These types of caches and others may be included in various embodiments and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Focus on Underperformance

The underperformance analysis integrates models and scores to assess a company's performance against its relevant peer group. This analysis zeroes in on a company's underperformance relative to its peers, using it as an indicator for potential fraudulent financial reporting, as both empirical evidence and academic research suggest a correlation between consistent underperformance and the risk of financial fraud. The underperformance analysis is encapsulated in three primary scores: lens model score, risk area model score, and academic score.

Figure 3:
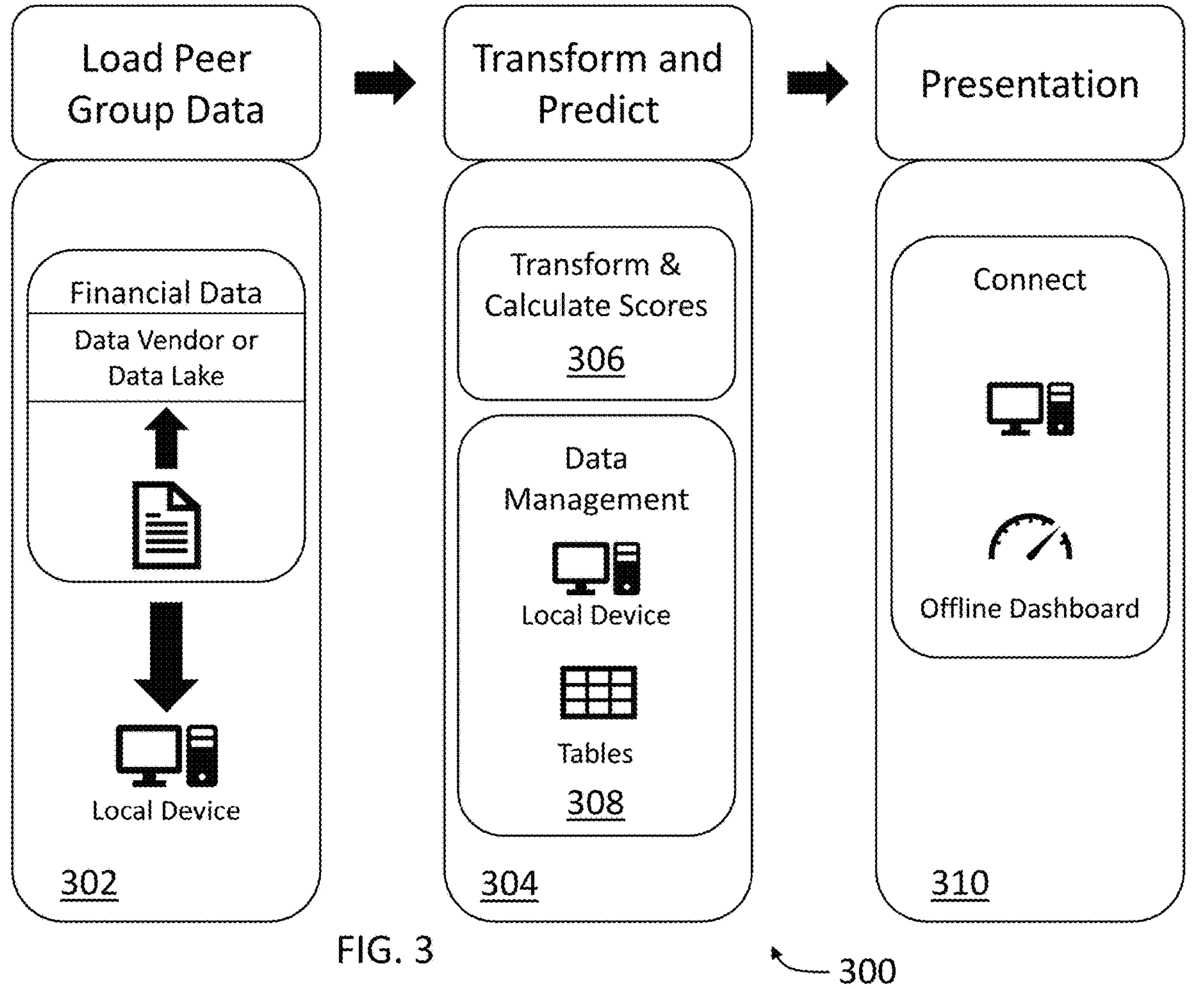
FIG. 3 illustrates at a high level a method of determining the risk of fraud by a target entity using the system of FIG. 1 and/or the computing device of FIG. 2.

FIG. 3 illustrates the workflow of embodiments of the invention. Specifically, FIG. 3 illustrates at a high level a method 300 of determining the risk of fraud by a target entity. Initially, target entity data and peer group data is loaded 302 into a database, such as database 106 (shown in FIG. 1) or database 218 (shown in FIG. 2). Server 102 (shown in FIG. 1) or processor 202 (shown in FIG. 2) can extract the raw peer group data from a third-party data provider system into database 106 or 218. The next step is to transform the data and predict 304 the likelihood of fraud. This step includes a sub-step of transforming and calculating scores 306, as described in further detail below, and a sub-step of data management 308. The first sub-step 306 uses the AI models 108 (shown in FIG. 1) and are processed using a data workflow application, that may be included in applications 114 (shown in FIG. 1) or applications 216 (shown in FIG. 2). After the data is transformed and scores generated, the results are presented 310 to users. The presentation can be via any suitable dashboard application, such as Power BI from Microsoft Corp., or via a web browser using webpages generated by server 102 and displayed by client device 104 (shown in FIG. 1). In addition, the scores are stored for further training or fine tuning of the AI models 108 as described above and further below in reference to FIGS. 16-19. This fine tuning enables greater accuracy in future analyses.

Figure 4:
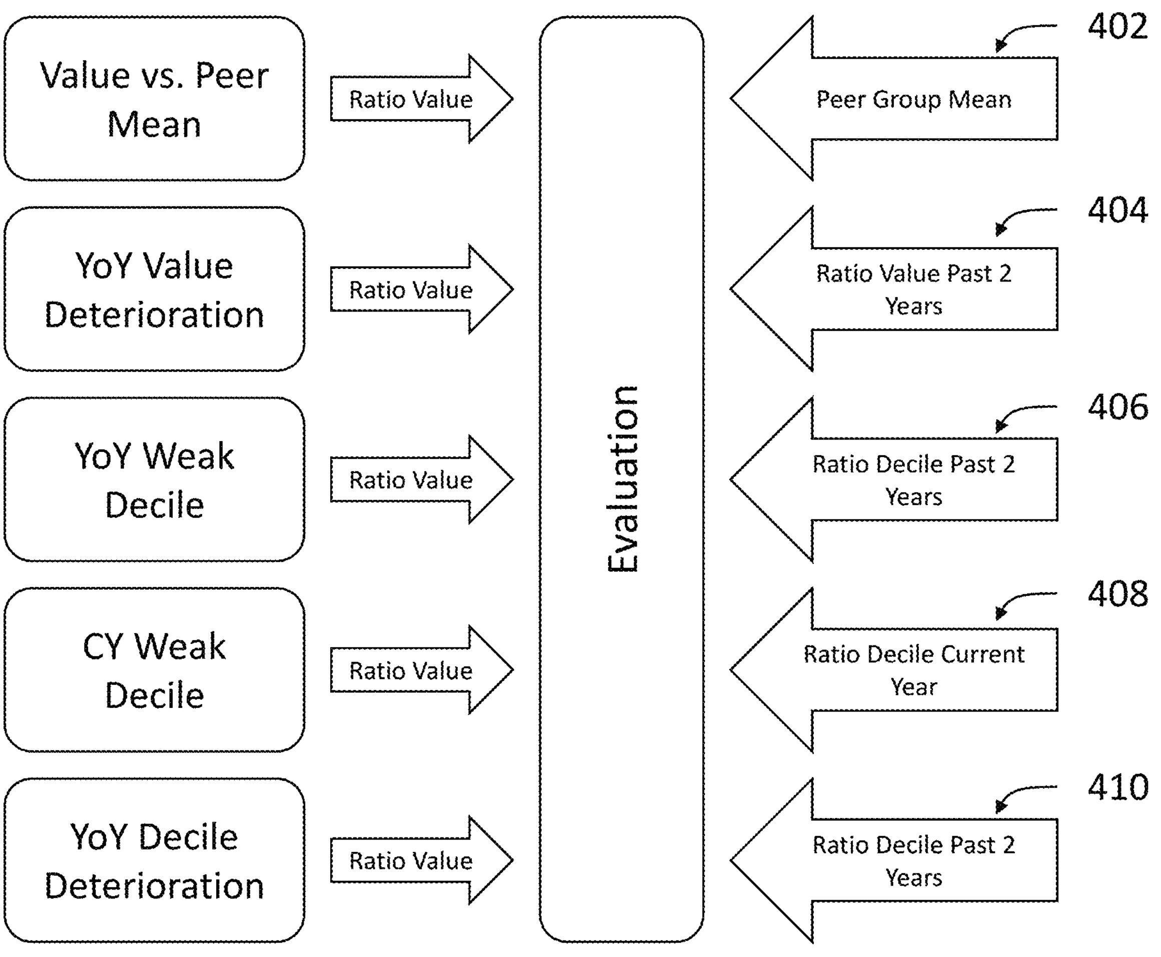
FIG. 4 illustrates how, using financial statement data and a series of analyses, the invention can calculate a final underperformance score indicating the potential that a target entity is committing fraud or has committed fraud within the scope of the data.

FIG. 4 illustrates how, using financial statement data and a series of analyses, the invention can calculate a final score indicating the potential that a target entity is committing fraud or has committed fraud within the scope of the data. The higher the score calculated, the higher the concern should be as to whether the target entity is issuing misleading financial and operational health information. Embodiments of the invention use a plurality of lenses to analyze different aspects of the financial ratio values calculated as detailed below.

As shown in FIG. 4, the invention looks for underperformance of the target entity as compared to its peer entities. For example, the invention can evaluate target entity ratio and decile values against peer ratio and decile values or against other target entity ratio or decile values, including as examples (i) a value vs. peer mean ratio value against a peer group mean 402; (ii) a year over year (YoY) value deterioration ratio value against a past year ratio value 404, both for the target entity; (iii) a YoY weak ratio decile against a ratio decile for the past three years 406, both for the target entity; (iv) a current year (CY) weak ratio decile against a different CY ratio decile 408, both for the target entity; and/or (v) a YoY decile deterioration ratio against a past year ratio decile 410, both for the target entity. See Table 4 below for additional information of these ratios and comparisons.

Figure 5:
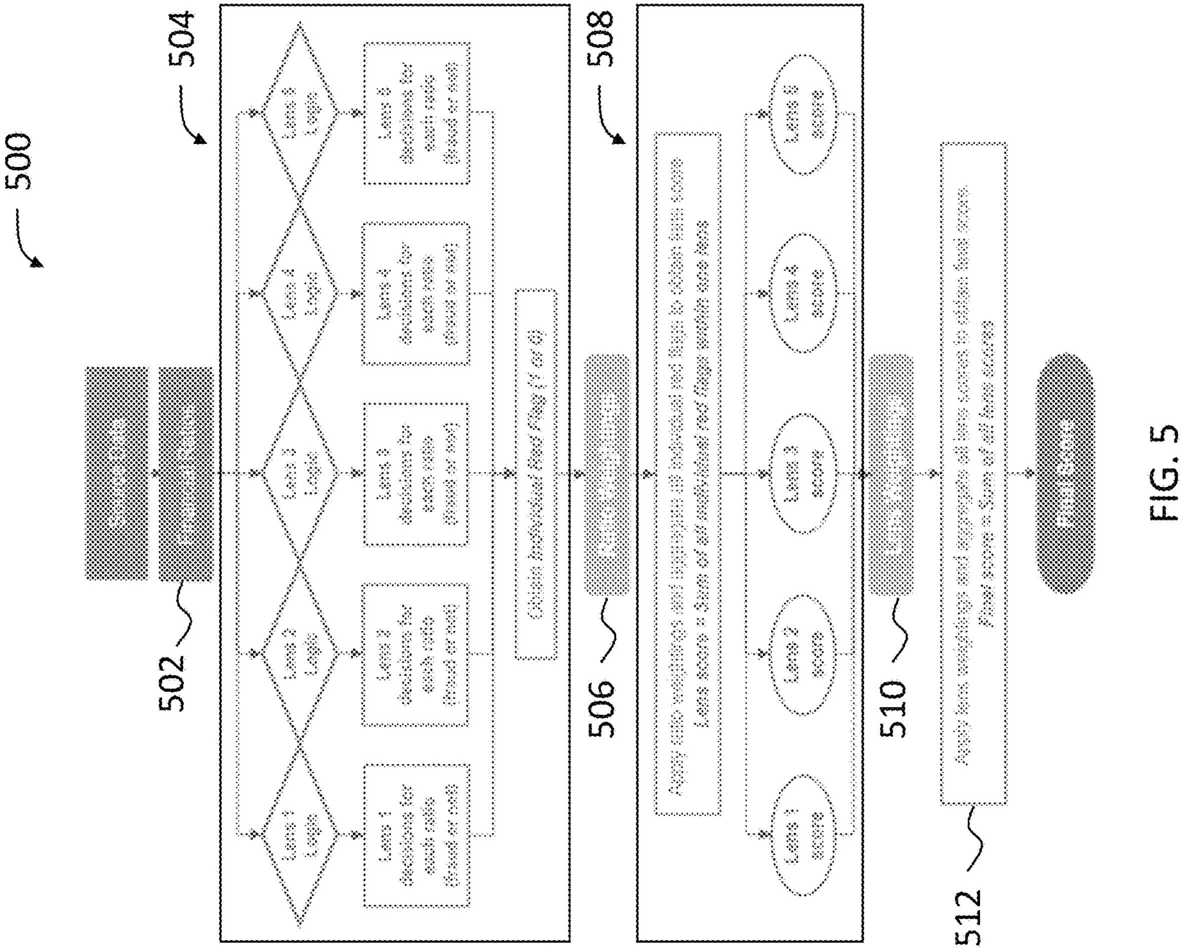
FIG. 5 is a flowchart that illustrates a method for calculating a score representative of the risk of fraud by a target entity using the system of FIG. 1 and/or the computing device of FIG. 2.

FIG. 5 is a flowchart that illustrates a method 500 for calculating a score representative of the risk of fraud by a target entity. Method 500 may be performed by server 102 with data stored in database 106 and using AI models 108, and the end results being displayed for user interaction on client device 104 (all shown in FIG. 1). For example, the various applications, engines, or components may be included in applications 114 (also shown in FIG. 1) stored in server 102. Alternatively, method 500 may be performed entirely on computing device 200, with the various applications 216 interacting with database 218 (including AI models 108) to complete the analyses (all shown in FIG. 2). The flowchart of FIG. 5 illustrates how the scores and comparisons, and other calculations, indicate whether the target entity is engaged or has been engaged in fraudulent activity. As explained above, the data may comprise information relevant for determining whether a particular data point or set of data is indicative of fraudulent activity. Data types that can be analyzed using embodiments of the invention include historical data on fraudulent entities, financial statement data (e.g., balance sheets, income statements, and cash flow statements), and market performance data (e.g., credit rating, analyst recommendations, stock prices and stock price movement, and past dividends).

Initially, a missing data treatment analysis is performed on the data. Specifically, the missing data treatment is performed on gaps in the financial data and regulatory reporting data related to the target entity. The absence of data reduces statistical power and causes bias in the estimation of parameters. The missing data treatment enables identification of incomplete, inaccurate, or irrelevant data to ensure a good quality of data. Four missing data examples are shown in Table 1.

TABLE 1

| Scenarios | Meaning | Solution |
|---|---|---|
| One ratio is blank for all companies in one industry or sub-industry. For example, financial industry companies don't have inventory-related ratios | This ratio is meaningless for this industry or sub-industry | Keep blank without any treatment |
| For a particular company, all the financial ratios are blank for the first or last few years in the data | Case 1: If the company has all blank ratios in the first few years, it indicates that the company had not yet listed during those years, hence the data is not available. Case 2: If the company has all blank ratios in the last few years, it indicates that the company has been delisted, hence there is no data afterward. | For a particular company, all the financial ratios are blank for the first or last few years in the data |
| For a particular company, all the financial ratios are blank in one middle year | The company doesn't publish its financial statement due to some reason; we can infer its value by assuming its value increased or decreased at a constant rate | Take an average ratio of previous year and subsequent year. For example, Ratios in Year 2017 = (Ratios in Year 2016 + Ratios in Year 2018)/2 |
| One ratio is blank for one company with other ratios of this company are available | | Leverage on the decile position of other available ratios among peer group. For example, if ratio 1 is missing but other ratios are not, and other ratios are in 4th decile position among peer group, ratio 1 can be replaced with 4th decile position. |

Following the missing data analysis and treatment, an outlier data analysis and treatment is performed on the financial data or regulatory reporting data related to the target entity. For example, when computing the statistics, the outliers of a ratio in one peer group need to be removed to avoid the impact of those extreme values on the statistical results. For example, if one company's average age of inventory is much greater than peers' average age of inventory, then the mean statistics of the average age of inventory would be increased and have less accuracy. Outliers are defined as the data points that lie N times interquartile range (IQR) outside the first quartile (Q1) or third quartile (Q3), while IQR is the difference between Q1 and Q3, as shown in Equation 1.

$$IQR = Q3 - Q1 \quad \text{Eq. 1}$$

For example, with N=1.5, a number x is considered an outlier if:

$$x < Q1 - IQR \times 1.5 \text{ or}$$
$$x > Q3 + IQR \times 1.5$$

Outliers in each distribution of financial ratios can be removed from the data to decrease the bias in the distribution. Once the outliers are removed, the statistics can be calculated on the remaining data points and used in the lens calculation process.

Figure 6:
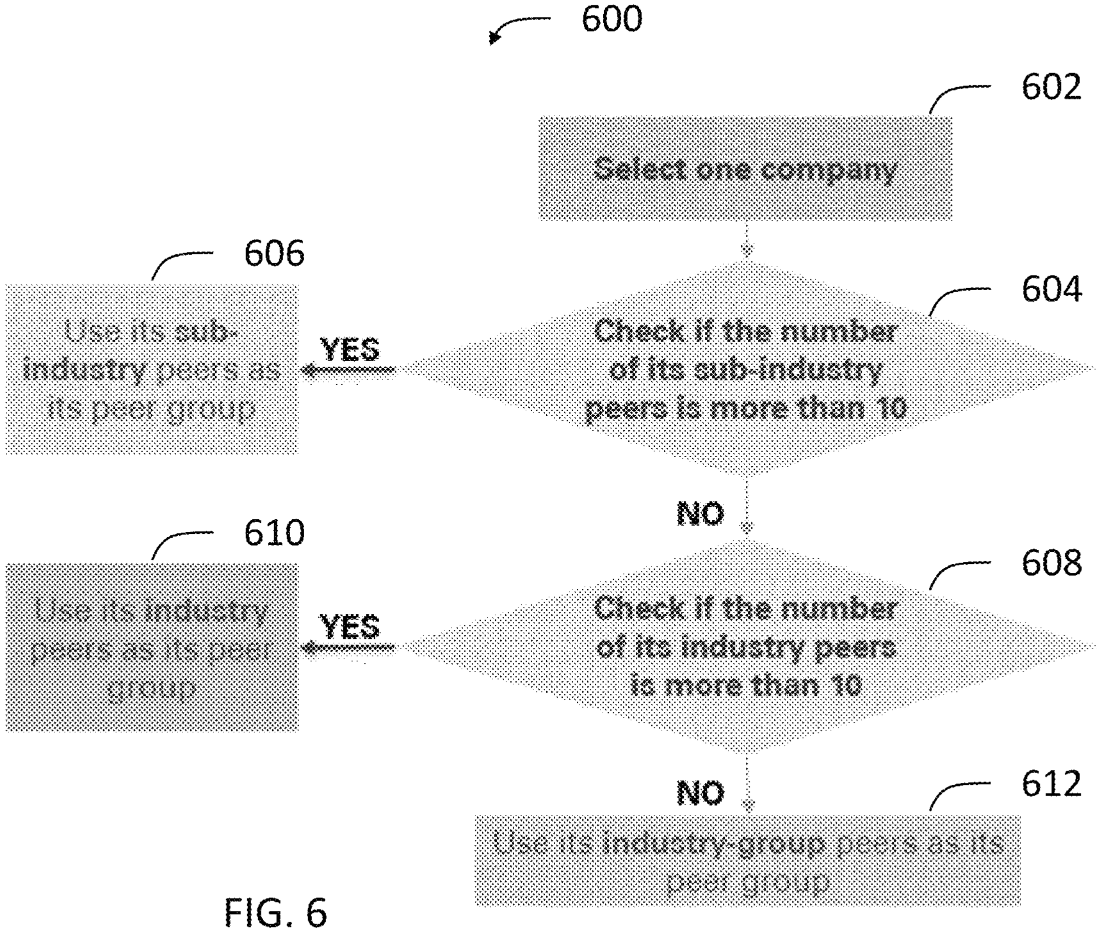
FIG. 6 is a flowchart that shows a method of selecting a peer group of entities to compare against a target entity in the method of FIG. 5.

Following the source data analyses, a peer group of entities to the target entity can be selected for the purposes of evaluating the overall fraud risk for the target entity. FIG. 6 is a flowchart that shows a method 600 of selecting a peer group of entities. Like method 500 of FIG. 5, method 600 of FIG. 6 may be performed by server 102 with data stored in database 106 and using AI models 108 (all shown in FIG. 1). Alternatively, method 600 may be performed entirely on computing device 200 (shown in FIG. 2). First, the target entity is selected 602. A processor, under control of software, determines 604 if the target entity has ten or more sub-industry peers. If yes, the target entity's sub-industry peers are identified 606 as the peer entities. If no, the process, under control of software, determines 608 if the target entity has ten or more industry peers. If yes, the target entity's industry peers are identified 610 as the peer entities. If no, the target entity's industry-group peers are identified 612 as the peer entities. In some embodiments, all of the members of these groups may be identified as peer entities (e.g., all sub-industry peers if there are more than ten). In other embodiments, only ten or some other subset of the group members may be identified as peer entities (e.g., ten out of a group of twenty). The entities included in the target entity's sub-industry peers, industry peers, or industry-group peers can be based on a variety of aspects and/or can be taken from a classification taxonomy such as the Global Industry Classification Standard published by MSCI Inc.

Returning to FIG. 5, after the data is fixed and peer entities are selected, a plurality of financial ratios are calculated 502 for the target entity and the peer group entities. There are fifteen financial ratios used for the risk scoring models. These ratios are ranked according to their predictive strength, which is estimated based on research findings. Economic intuition and financial weakness underpin the directional analysis. Some financial ratios will exhibit a higher chance of fraud risk when their respective values are very high and vice versa where a low value indicates potential financial weaknesses. As shown in Table 2, the directional indicator of each ratio is assumed by considering its economic meaning within the context of estimating chance of fraud. The ratios are stored in database 106 or database 218, linked to the appropriate entity (target entity or peer entity).

TABLE 2

| Financial Ratio | Risk Direction | Description |
|---|---|---|
| Age of Inventory | Greater | Rising inventory days will indicate rising levels of inventory which may suggest inventory obsolescence or incorrect inventory valuations. |
| Assets Turnover | Lesser | A low and/or decreasing rate indicates the following:<br>the possible capitalization of expenses,<br>failure to write-off uncollectible receivables or obsolete stock,<br>fraudulent assessment of closing stock,<br>inappropriate fair value policy/assumptions, or<br>failing to impair actual losses on assets, including intangible assets. |
| Collection Ratio | Greater | Rising receivable days will indicate uncollectable receivables are retained in receivables/debtors. |
| Current Ratio | Lesser | Low or decreasing ratio could indicate possible asset theft or embezzlement. |
| Debt to Equity | Greater | An excessive reliance on debt puts pressure on borrowing covenants and higher interest cost can mute profitability.<br>Where borrowers are under pressure to show sound financial performance, they are more likely to fabricate transactions to sustain or increase their access to working capital and/or other finance.<br>A rapid increase in debt to fund growth could also indicate fraudulent activity as debt may be required to fund undisclosed losses or misappropriations. |
| EBITDA Margin | Lesser | Weak EBITDA is driven by weak profitability and may incentivize management to overstate revenues and understate expenses.<br>EBITDA is also seen as proxy for cash flow and as such flattering EBITDA helps suggest better cash flow to investors and creditors. |
| Net Income Ratio | Lesser | Weak profitability may incentivize management to overstate revenues and understate expenses. |
| Inventory to Total Net Sales | Greater | High and rising levels of inventory to sales indicate the potential of obsolete stock that should be impaired or fictious stock used to hide trading losses. |
| Inventory Turnover | Lesser | Low or falling ratio due to high and/or rising levels of inventory to cost of goods sold could indicate genuine obsolete stock that should be impaired and/or fictitious stock being recorded to hide trading losses. |
| Operating Cashflow to Revenue | Lesser | Weak OCF concerns creditors and investors worried about shortfalls in service debt, invest in the business and paying dividends.<br>Management may be incentivized to overstate revenues and understate expenses.<br>Falling OCF could result from receivables and inventory increasing through fraudulent transactions. |
| Quick Ratio | Lesser | Low or decreasing ratio could indicate possible asset theft or embezzlement. |

TABLE 2-continued

| Financial Ratio | Risk Direction | Description |
|---|---|---|
| Receivable Turnover | Lesser | Higher ratio could result from lower levels of genuine receivables that may indicate potential uncollectable receivables. |
| Return on Assets | Lesser | Weak profitability may incentivize management to overstate revenues and understate expenses to hide losses. |
| Total Liabilities over | Greater | A high and/or increasing ratio can suggest fraud. An excessive reliance on debt puts pressure on borrowing covenants and causes higher interest cost that reduce profitability. Furthermore, where borrowers are under pressure to show sound financial performance, they are more likely to undertake profit enhancing accounting policies, capitalize expenses and fabricate transactions to sustain or increase their access to working capital and/or other finance. |
| Total Assets | Lesser | Falling and/or is low ratio could indicate borrowers are under pressure to show sound financial performance and may engage in fraudulent reporting. |

From a company's financial statements, such as balance sheets, income statements, and cash flow statements, the ratios for each company are computed using the formulas shown in Table 3.

TABLE 3

| Financial Ratio | Formula |
|---|---|
| Age of Inventory | $365 \times \frac{\text{Cost of Goods sold}}{\left(\frac{\text{Inventory}_t + \text{Inventory}_{t-1}}{2}\right)}$ |
| Assets Turnover | $\frac{\text{Total Revenues}}{\left(\frac{\text{Total Assets}_t + \text{Total Assets}_{t-1}}{2}\right)}$ |
| Collection Ratio | $365 \times \frac{\text{Revenues}}{\left(\frac{\text{Accounts receivable}_t + \text{Accounts receivable}_{t-1}}{2}\right)}$ |
| Current Ratio | $\frac{\text{Total current Assets}}{\text{Total current Liabilities}}$ |
| Debt to Equity | $\frac{\text{Total Debt}}{\text{Total Equity}} \times 100$ |
| EBITDA Margin | $\frac{\text{EBITA}}{\text{Total Revenues}}$ |
| Net Income Ratio | $\frac{\text{Net Income}}{\text{Revenues}}$ |
| Inventory to Total Net Sales | $\frac{\text{Inventory}}{\text{Revenues}}$ |
| Inventory Turnover | $\frac{\text{Cost of Goods sold}}{\left(\frac{\text{Inventory}_t + \text{Inventory}_{t-1}}{2}\right)}$ |
| Operating Cashflow to Revenue | $\frac{\text{Net Income } CF + \text{Depreciation and } amortisation + amortisation \text{ of deferred charges} + \text{non cash items} + \text{change in net operating assets}}{\text{Revenues}}$ |
| Quick Ratio | $\frac{\text{Cash and Short Term Investments} + \text{Accounts Receivable} + + \text{Cash Equivalent fin} + \text{Short Term Investment fin} + \text{Other Receivables}}{\text{Total current Liabilities}}$ |
| Receivable Turnover | $\frac{\text{Revenues}}{\left(\frac{\text{Accounts Receivable}_t + \text{Accounts Receivable}_{t-1}}{2}\right)}$ |

TABLE 3-continued

| Financial Ratio | Formula |
|---|---|
| Return on Assets | $0.625 \times \frac{EBIT}{\left(\frac{\text{Total Assets}_t + \text{Total Assets}_{t-1}}{2}\right)} \times 100$ |
| Total Liabilities over Total Assets | $\frac{\text{Total Liabilities}}{\text{Total Assets}} \times 100$ |
| Working Capital to Total Assets | $\frac{\text{Total current Assets} - \text{Total current Liabilities}}{\text{Total Assets}}$ |

Following the ratio calculations, deciles ranks are calculated for the target entity and for the peer group entities for each financial ratio. Like the ratios described above, the decile ranks are stored in database 106 or database 218, linked to the appropriate entity (target entity or peer entity). The risk area model and the lens model use the decile rank logic of a ratio for their calculations. As illustrated by FIG. 3, a ratio decile rank is a number between 1 (good) and 10 (weak) representing a company's ratio performance in its peer group considering the risk direction. Each of the financial ratios' decile ranks in its respective peer group is calculated by first removing outliers, then making a quantile calculation, then making a decile calculation. The outlier removal analysis is performed using Equation 2 where x is a ration in year t for the number N of entities in the peer group.

$$X_t = (x_{1,t}, x_{2,t}, \ldots, x_{N,t}) \quad \text{Eq. 2}$$

The quantile calculation uses Equations 3 and 4:

$$q_{0.0} = \min(X_t),\ q_{1.0} = \max(X_t) \quad \text{Eq. 3}$$

$$q_i = \text{quantile}(X_t, i) \text{ for } i \text{ in } 0.1, \ldots, 0.9 \quad \text{Eq. 4}$$

The decile calculation uses Equation 5 where the decile p for entity n in year t is calculated as:

$$p_{n,t} = 10 * i \text{ if } q_{i-0.1} \le x_{n,t} < q_i \text{ for } i \text{ in } 0.1, \ldots, 1.0 \quad \text{Eq. 5}$$

Finally, the decile rank calculation uses Equation 6 where the decile rank $\tilde{p}^{(r)}_{n,t}$ depends on the risk direction $r \in [-1,1]$ of the ratio.

$$\tilde{p}^{(r)}_{n,t} = \begin{cases} p_{n,t} & \text{if } r = 1 \\ 11 - p_{n,t} & \text{if } r = -1 \end{cases} \text{ for } i \text{ in } 1, \ldots, 10 \quad \text{Eq. 6}$$

After the calculation of ratios and deciles for the target entity and peer entities, a plurality of lens model scores is calculated 504 indicative of fraud risk for the target entity. As will be discussed below, the lens model score calculations include the steps of calculating a plurality of ratio weights, calculating a plurality of lens weights, and applying one or more lens logic algorithms to the ratio weights to determine a fraud risk for each lens. As will also discussed below, applying thee lens logic algorithms includes the steps of defining a threshold value, applying a business logic to the ratio weights, and generating a lens decision for each ratio weight indicative of fraud risk for the target entity.

Figure 7:
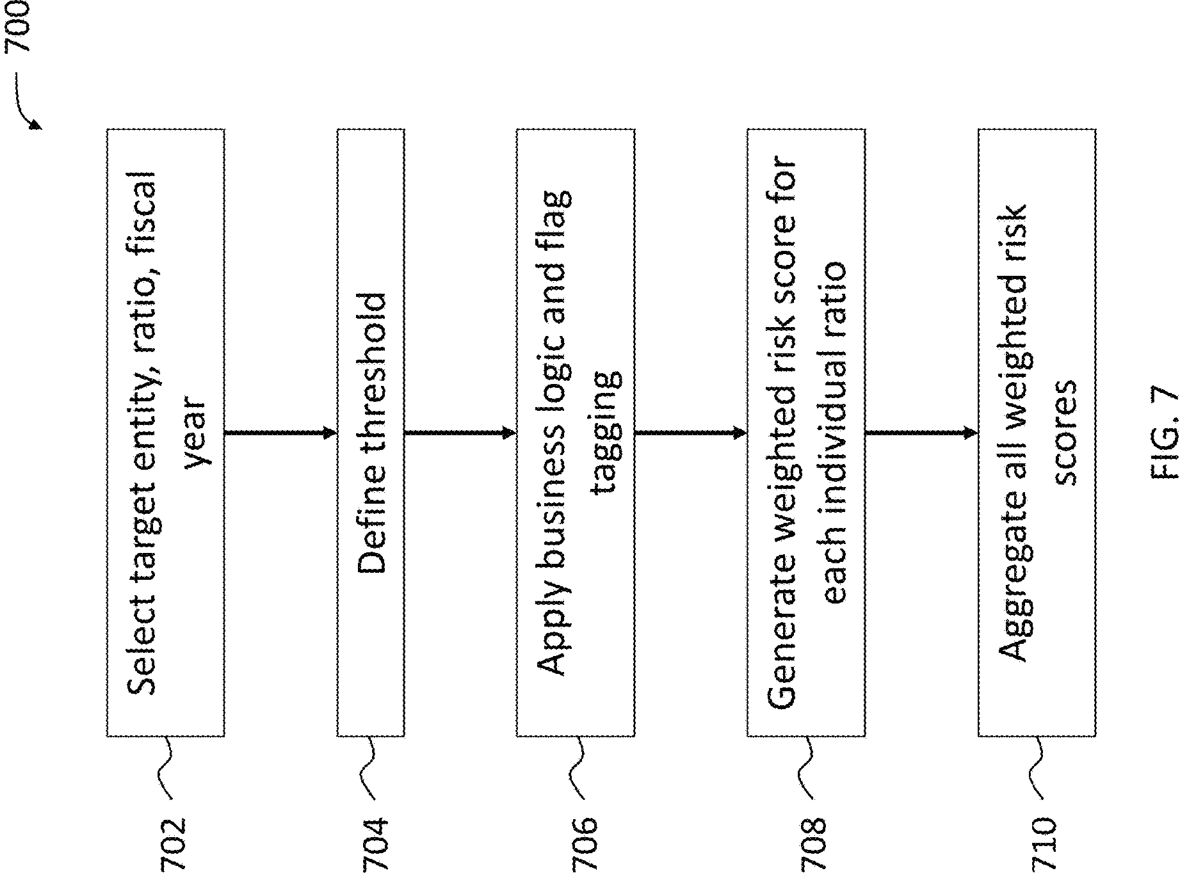
FIG. 7 is a flowchart illustrating a method of performing the lens calculations for the target entity and peer entities.

FIG. 7 is a flowchart illustrating a method 700 of performing the lens calculations. Like method 500 of FIG. 5, method 700 of FIG. 7 may be performed by server 102 with data stored in database 106 and using AI models 108 (all shown in FIG. 1). Alternatively, method 700 may be performed entirely on computing device 200 (shown in FIG. 2). Like the ratios and decile ranks described above, the lens scores are stored in database 106 or database 218, linked to the appropriate entity (target entity or peer entity).

There are many angles to consider when evaluating the financial health of a business. Therefore, when analyzing the probability of fraud, the best approach combines different component analyses to form a complete picture. In this model, quantitative analyses considering the eight most relevant financial metrics is carried out through five analytical lenses. These five lenses provide a comprehensive view through a series of vertical and horizontal analyses, looking at different dimensions of a company's performance and its peer comparison. Initially, the target entity, specific ratio to analyze, and the fiscal year of analysis are identified 702. A threshold value is also selected 704 for each lens. The threshold value may be manually selected based on expert knowledge or analysis or may be calculated by AI model 108*a*.

Next, the business logic is applied and values greater than the threshold values are flagged 706. Let 0 be the output score from the lens model and $$L^l_{x_i}$$

the lens result that can have the value 1 if the lens activates or 0 elsewise. There are five different lenses l applied on the eight ratios $x_{i=1, \ldots, 8}$. The lens model score can then be calculated as shown in Equation 7.

$$O = \sum_{l=1}^{5} \sum_{i=1}^{16} w_i a_l L^l_{x_i} \quad \text{Eq. 7}$$

where $w_i$ are the optimized ratio weights, $a_l$ are the optimized lens weights, $\Theta_i$ is the set of all peer group entities and trend information of ratio $x_i$, and the lens model output score is:

$$L^l_{x_i} = \sigma^l(x_i \mid \Theta_i) = \begin{cases} 1, & \text{if lens } l \text{ activated by ratio } x_i \\ 0, & \text{if lens } l \text{ is not activated by ratio } x_i \end{cases} \quad \text{Eq. 8}$$

It should be noted that $\sigma^{j}(x_i|\Theta_i)$ is a general term for the lens calculation and, more precisely, the parameter $\Theta_i=\Theta^j(x_{i,j})$ signalizes the peer group and trend information for the target entity j on the ratio value $x_{i,j}$. Using the information above, the lens model scores are calculated for each entity in the reported year within the peer group and a high-risk year is predicted if the score exceeds the threshold of 0.13. Table 4 shows details of the lenses and how the application 114*d*/216*d* flags them as indicative of fraud or not.

TABLE 4

| Lens Name | Definition/Conditions |
|---|---|
| Value vs. Peer Mean | This lens triggers a red flag if the current year ratio value is more than 10% distanced in the under-performing risk direction against the peer group mean. $\text{Flag} = \begin{cases} 1, & \frac{x_t - \overline{x_t}}{\overline{x_t}} \leq -10\% \\ 0, & \text{otherwise} \end{cases}$ if ratio risk direction is "lesser than" $\text{Flag} = \begin{cases} 1, & \frac{x_t - \overline{x_t}}{\overline{x_t}} \geq 10\% \\ 0, & \text{otherwise} \end{cases}$ if ratio risk direction is "greater than" |
| YoY Value Deterioration | This lens triggers a red flag if the movement of the current year ratio value deteriorates more than 10% against the ratio value in the previous year. The deteriorating direction is defined by the under-performing risk direction of the ratio. $\text{Flag} = \begin{cases} 1, & \frac{x_t - x_{t-1}}{\lvert x_{t-1}\rvert} \leq -10\% \\ 0, & \text{otherwise} \end{cases}$ if ratio risk direction is "lesser than" $\text{Flag} = \begin{cases} 1, & \frac{x_t - x_{t-1}}{\lvert x_{t-1}\rvert} \leq -10\% \\ 0, & \text{otherwise} \end{cases}$ if ratio risk direction is "greater than" |
| YoY Weak Decile | This lens triggers a red flag if the ratio value stays in the three weakest peer group deciles in the past three years t and t-1. The three weak deciles (either [1, 2, 3] or [8, 9, 10]) are defined by the under-performing risk direction of the ratio. $\text{Flag} = \begin{cases} 1, & \max(p_t, p_{t-1}) \leq 3 \\ 0, & \text{otherwise} \end{cases}$ if ratio risk direction is "lesser than" $\text{Flag} = \begin{cases} 1, & p_t \geq 8 \\ 0, & \text{otherwise} \end{cases}$ if ratio risk direction is "greater than" |
| CY Weak Decile | This lens triggers a red flag if the current year ratio value is in one of the three weakest peer group deciles. The three weak deciles (either [1, 2, 3] or [8, 9, 10]) are defined by the under-performing risk direction of the ratio. $\text{Flag} = \begin{cases} 1, & p_t \leq 3 \\ 0, & \text{otherwise} \end{cases}$ if ratio risk direction is "lesser than" $\text{Flag} = \begin{cases} 1, & p_t \geq 8 \\ 0, & \text{otherwise} \end{cases}$ if ratio risk direction is "greater than" |
| YoY Decile Deterioration | This lens triggers a red flag if the current ratio value deteriorates by at least one peer group decile movement against its past year. The deteriorating direction is defined by the under-performing risk direction of the ratio. $\text{Flag} = \begin{cases} 1, & p_t - p_{t-1} \leq -1 \\ 0, & \text{otherwise} \end{cases}$ if ratio risk direction is "lesser than" $\text{Flag} = \begin{cases} 1, & p_t - p_{t-1} \geq 1 \\ 0, & \text{otherwise} \end{cases}$ if ratio risk direction is "greater than" |

As shown in FIG. 5 and FIG. 7, ratio weights are then applied at step 506/708. The weighted scores across the lens calculations are aggregated at step 508/710 to form a weighted risk score for the target entity and each peer entity. As shown in FIG. 5 only, lens weights are applied 510 and the twice weighted lens scores are aggregated 512 to form a final overall lens score.

Figure 8:
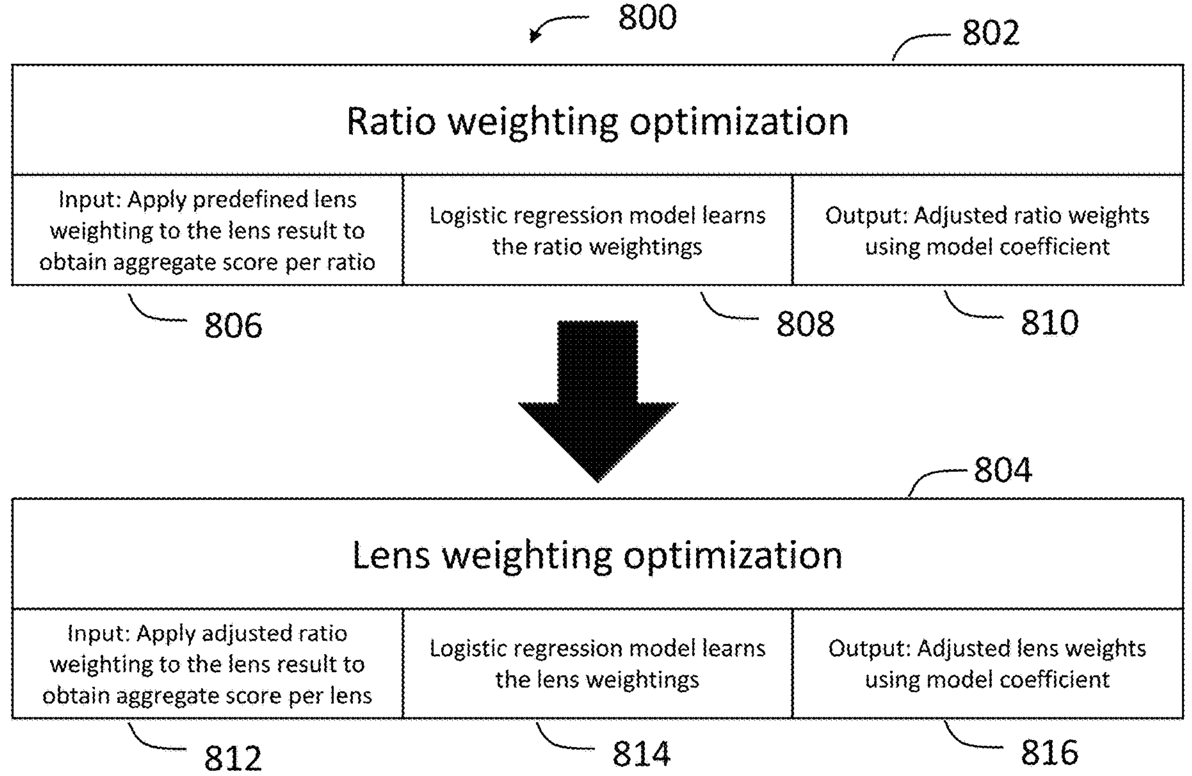
FIG. 8 is a flow chart illustrating a method of calculating and applying ratio weights and lens weights.

FIG. 8 is a flow chart illustrating a method 800 of calculating and applying ratio weights and lens weights. Like the methods described above in FIGS. 5-7, method 800 of FIG. 8 may be performed by server 102 with data stored in database 106 and using AI models 108 (all shown in FIG. 1). Alternatively, method 700 may be performed entirely on computing device 200 (shown in FIG. 2). Like the ratios and decile ranks described above, the lens scores are stored in database 106 or database 218, linked to the appropriate entity (target entity or peer entity).

With a set of trainings companies, two logistic regression models are applied to learn the optimized ratio weights $w_{i=1, \ldots, 8}$ and the optimized lens weights $\alpha_{i=1, \ldots, 8}$ so that risk gets minimal for assigning unseen companies to a class. Logistic regression, also known as logit regression or logit model, is a mathematical model used in statistics to estimate the probability of an event occurring. Logistic regression works in this case with binary data, where either the fraud happens (1) or fraud does not happen (0).

In an embodiment, ratio weights are optimized 802 then lens weights are optimized 804. During ratio weight optimization, the first logistic regression model is applied to find the best ratio weights $w_{i=1, \ldots, 8}$. Let Y be the binary target variable and $x_{i=1, \ldots, 8}$ be the eight ratios above. Under the logistic regression model, it is assumed that $\mathbb{P}(Y=1|X)=\mathbb{P}(Y)$. In addition, $\alpha_{=1, \ldots, 5}$ can be defined 806 as the predefined lens weights as shown in Table 5.

TABLE 5

| Lens | Predefined Weights |
|---|---|
| YoY Value Deterioration | 0.05 |
| YoY Weak Decile | 0.05 |
| Value vs. Peer Mean | 0.15 |
| CY Weak Decile | 0.41 |
| YoY Decile Deterioration | 0.34 |

After the lens weights are defined, the logistic regression model can be used to calculate 808 optimized ratio weights using Equation 9.

$$\log\left(\frac{\mathbb{P}(Y)}{1-\mathbb{P}(Y)}\right) = coef_0 + coef_1\tilde{X}_1 + \ldots + coef_{16}\tilde{X}_{16}, \quad \text{Eq. 9}$$

where $$\tilde{X}_i = \sum_{l=1}^{5} a_l \times L_{l,i},$$

$$L^l_{x_i} = \sigma^l(x_i \mid \Theta_i) = \begin{cases} 1, & \text{if lens } l \text{ activated by ratio } x_i \\ 0, & \text{if lens } l \text{ is not activated by ratio } x_i \end{cases}$$

and $\Theta_i$ represents the set of all peer group and trend information of ratio $x_i$.

The ratio weights w; can then be adjusted 810 based on the estimated coefficient $coef_i$ from the logistic regression model results of Equation 8. The goal is to magnify the sum of the final ratio weights to 1 and to shift all negative coefficients to a reasonable lower bound. The coefficient adjustments are shown in Table 6.

TABLE 6

Case 1 If the coefficient $coef_i$ is negative, then the weight is set at 0.05. $w_i = 0.05\ \forall\ coef_i \le 0$ Case 2 If the coefficient $coef_i$ is positive, then the weight is the ratio of the variable's coefficient and the sum of all variables' coefficients.

$$w_i = \frac{coef_i}{\sum_k coef_k \times I(coef_k > 0)} \times \left(\eta - \sum_k I(coef_k \le 0) \times 0.05\right)$$

Where I is the indicator function $$I(x > 0) = \begin{cases} 1 & x > 0 \\ 0 & x \le 0 \end{cases}, \text{ and } \eta = \text{magnitude} = 1.$$

TABLE 6-continued

The correction term for each of the coefficient guaranties that the sum over the weights is $\Sigma_i\, w_i = 1$.

After the adjustment, the final ratio weights can be, in some embodiments, those shown in Table 7.

TABLE 7

| Ratio | Weight |
|---|---|
| Operating Cashflow to Revenue | 0.05 |
| Asset Turnover | 0.135672224844795 |
| Quick Ratio | 0.05 |
| Total Liabilities Over Total Assets | 0.210603524633406 |
| Working Capital to Total Assets | 0.05 |
| Net Income Ratio | 0.232828526715438 |
| Collection Ratio | 0.220895723806358 |
| Average Age of Inventory | 0.05 |

After the ratio weights are calculated 802, the lens weights are calculated 804. A second logistic regression model is applied using 812 the adjusted ratio weights to find the best lens weights $\alpha_{i=1, \ldots, 5}$. Let Y be the binary target variable and $L_{i=1, \ldots, 5}$ the five lens values. Under the second logistic regression model, it is assumed that $\mathbb{P}(Y=1|X)=\mathbb{P}(Y)$. The second logistic regression model for calculating 814 the optimized lens weights is defined as Equation 10.

$$\log\left(\frac{\mathbb{P}(Y)}{1-\mathbb{P}(Y)}\right) = coef_0 + coef_1\tilde{L}_1 + \ldots + coef_{16}\tilde{L}_{16}, \quad \text{Eq. 10}$$

where $$\tilde{L}_l = \sum_{i=1}^{16} w_i \times L_{l,i},$$

$$L^l_{x_i} = \sigma^l(x_i \mid \Theta_i) = \begin{cases} 1, & \text{if lens } l \text{ activated by ratio } x_i \\ 0, & \text{if lens } l \text{ is not activated by ratio } x_i \end{cases}$$

and $\Theta_i$ represents the set of all peer group and trend information of ratio $x_i$.

The lens weights $\alpha_i$ can then be adjusted 816 based on the estimated coefficient $coef_i$ from the logistic regression model results of Equation 9. The goal is to magnify the sum of the final lens weights to 1 and to shift all negative coefficients to a reasonable lower bound. The coefficient adjustments are shown in Table 8.

TABLE 8

Case 1 If the coefficient $coef_i$ is negative, then the weight is set at 0.05. $a_i = 0.05\ \forall\ coef_i \le 0$ Case 2 If the coefficient $coef_i$ is positive, then the weight is the ratio of the variable's coefficient and the sum of all variables' coefficients.

$$a_l = \frac{coef_i}{\sum_k coef_k \times I(coef_k > 0)} \times \left(\eta - \sum_k I(coef_k \le 0) \times 0.05\right)$$

where I is the indicator function $$I(x > 0) = \begin{cases} 1 & x > 0 \\ 0 & x \le 0 \end{cases}, \text{ and } \eta = \text{magnitude} = 1.$$

The correction term magnifies the sum over the optimized weights and the sum over the initial weights to be the same size $\Sigma_l\alpha_l = \Sigma_l\alpha_l = 1$.

After the adjustment, the final lens weights can be, in some embodiments, those shown in Table 9.

TABLE 9

| Lens | Weight |
| --- | --- |
| Value vs. Peer Mean | 0.016065673362603287 |
| YoY Weak Decile | 0.45563350970898553 |
| YoY Value Deterioration | 0.16262534237480364 |
| CY Weak Decile | 0.05 |
| YoY Decile Deterioration | 0.3156754745536075 |

After the ratio weights and lens weights are calculated and optimized and a final lens score is determined for the target entity, a plurality of risk area scores indicative of fraud risk for the target entity are calculated using a risk engine or application **114*e*/216*e*. These scores are stored in database 106 or database 218**, linked to the appropriate entity (target entity or peer entity). Let F be the output score from the risk area model and $R^r$ the risk area result that can have the value 1 if the risk area activates or 0 elsewise. There are four risk areas $\rho_{r=1, \ldots, 4}$ using fifteen different ratios $x_{i=1, \ldots, 15}$. Table 10 shows the ratio assignment to its risk area.

TABLE 10

| Risk Area | Ratios |
| --- | --- |
| Asset Composition | Age of Inventory, Asset Turnover, Collection Ratio, Inventory to Total Net Sales, Inventory Turnover, Receivable Turnover |
| Liquidity | Current Ratio, Operating Cashflow to Revenue, Quick Ratio, Working Capital to Total Assets |
| Profitability | EBITDA Margin, Net Income Ratio, Return on Assets |
| Solvency | Debt to Equity, Total Liability over Total Assets |

Each risk area is defined as the median decile rank for its associated ratios. Hence, a risk area determines the median performance of a company against a certain peer group. Let $\tilde{x}_{i=1, \ldots, 15}$ be the decile rank for the ratios $x_{i=1, \ldots, 15}$ and $m_r=\{i:\rightarrow r\}$ the ratio mapping to the risk area. The risk area is defined as $\rho_r=\text{Median}(A_r)$ where $A_r=\{\tilde{x}_i: i \varepsilon m_r\}$ set of decile ranks. The risk area model score can then be calculated using Equation 11.

$$F = \sum_{r=1}^{4} b_r R^r \qquad \text{Eq. 11}$$

where $b_r$ = optimized risk area weights, and $$R^r = \mathbb{I}^r_{[8,9,10]}(\rho_r) = \begin{cases} 1, & \text{if risk area } \rho \in \text{weak deciles } [8, 9, 10] \\ 0, & \text{if risk area } \rho \notin \text{weak deciles } [8, 9, 10] \end{cases}.$$

The risk area model score is calculated for each entity's reported year within the peer group. It is then predicted whether the score will exceed the threshold of 0.17. A logistic regression model is then applied to find the best risk area model weightings $b_{r=1, \ldots, 4}$. When applying the logistic regression model, let Y be the binary target variable and $R_r=1, \ldots, 4$ (the five risk area values). Under the logistic regression model, it is assumed that $\mathbb{P}(Y=1|X)=\mathbb{P}(Y)$ . . . . Thus, the logistic regression model for find the optimized risk area weights is shown as Equation 12.

$$\log\left(\frac{\mathbb{P}(Y)}{1-\mathbb{P}(Y)}\right) = coef_0 + coef_1 R_1 + \ldots + coef_{16} R_{16}, \qquad \text{Eq. 12}$$

where $$R^r = \mathbb{I}^r_{[8,9,10]}(\rho_r) = \begin{cases} 1, & \text{if risk area } \rho \in \text{weak deciles } [8, 9, 10] \\ 0, & \text{if risk area } \rho \notin \text{weak deciles } [8, 9, 10] \end{cases}.$$

Similar to the weight calculations and adjustments above, the risk area weights are then adjusted. It is necessary to calculate the risk area weightings $b_r$ based on the estimated coefficient coefi from the logistic regression model results with the goal to magnify the sum of the final lens weightings to 1 and shift all negative coefficient to a reasonable lower bound. The coefficient adjustments are shown in Table 11.

TABLE 11

| | |
| --- | --- |
| Case 1 | If the coefficient $coef_i$ is negative, then the weight is set at 0.05. $b_r = 0.05 \ \forall \ coef_i \le 0$ |
| Case 2 | If the coefficient $coef_i$ is positive, then the weight is the ratio of the variable's coefficient and the sum of all variables' coefficients. |

$$b_r = \frac{coef_i}{\sum_k coef_k \times I(coef_k > 0)} \times \left(\eta - \sum_k I(coef_k \le 0) \times 0.05\right)$$

where I is the indicator function $$I(x > 0) = \begin{cases} 1 & x > 0 \\ 0 & x \le 0 \end{cases}, \text{ and } \eta = \text{magnitude} = 1.$$

The correction term magnifies the sum over the optimized weights and the sum over the initial weights to be the same size $\Sigma_r b_r = 1$.

After the adjustment, the final risk area weights can be, in some embodiments, those shown in Table 12.

TABLE 12

| Risk Area | Weight |
| --- | --- |
| Asset Composition | 0.151575783 |
| Liquidity | 0.276547648 |
| Profitability | 0.544569488 |
| Solvency | 0.027307082 |

The process of the invention also includes calculating one or more academic scores indicative of fraud risk for the target entity. The academic scores an Altman Z-score and an Ohlson O-score for the target entity and for the peer entities. The target entity Z-score and O-score are compared to the peer entity Z-scores and O-scores. The academic score analysis provides benchmark information relating to two scoring approaches to identifying potentially distressed companies. These screens are used to obtain different perspectives on the entity's performance by using widely available analyses and compare these results to individual competitors in the peer group. The Ohlson O-score is an indicator that can help to predict bankruptcy. A score of 0.5 or higher suggests an entity might head for bankruptcy within the next two years. A probability of default can be obtained from the Ohlson O-score by calculating p(default) =exp(O-score)/(1+exp(O-score)). The factor X in the formula is 1 if Total Liabilities exceeds Total Assets, 0 otherwise. The factor Y in the formula is 1 if a net loss for the last two years, 0 otherwise. The Altman Z-score is the output of a credit-strength test that gauges a publicly traded manufacturing company's likelihood of bankruptcy. A Z-score of 1.8 or below suggests a company might be headed for bankruptcy, while a score closer to 3 suggests a company is in good financial shape.

Focus on Overperformance

The above description focuses on company underperformance against peers, and how those can be indicative of fraud. This section will focus on company overperformance against peers and how that can also be indicative of fraud. Process steps that are common may or may not be described again, or the description may be abridged. The results of an overperformance analysis are presented using one lens score analysis, like the lens score analysis done in the underperformance analysis.

As described above, embodiments of the invention calculate the lens model score by fiscal year for the target entity. Each year has its risk level defined over the lens model score. However, repetitively distressed companies have a significantly potential for fraudulent misreporting. The lens model score gives the level of overperformance on a three-year window. Hence, the company's level considers three consecutive years (including the selected year). The lens model emits a high risk when at least 2 out of the 3 years lens model scores are high. One or more of the AI models 108 or a different AI model engineered and trained on overperformance evaluation may be used to calculate the lens model scores for overperformance. These scores determine the distress level of a company by applying five different analyses (or lenses, as above) to eight financial statement ratios against a selected peer group. The steps for calculating these ratios and selecting the peer group are described above with respect to the underperformance model analysis.

Figure 9:
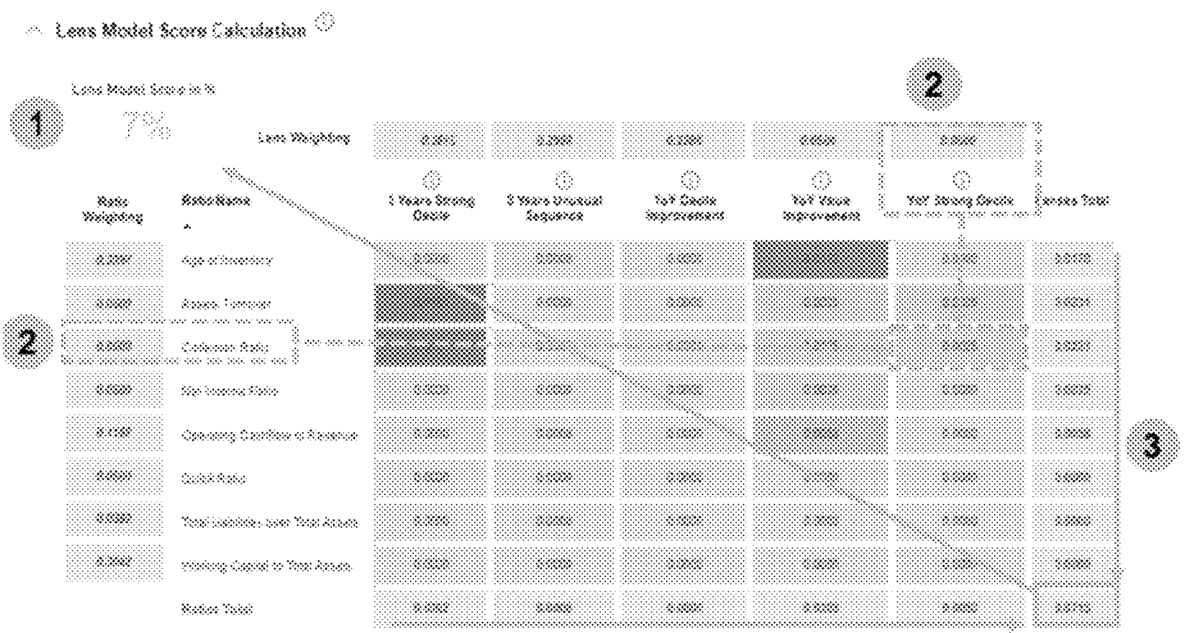
FIG. 9 illustrates the lens model scores for the target entity in an overperformance analysis.

FIG. 9 illustrates the lens model scores for the target entity, including the overall lens model score, the lens weights used to calculate the overall score, the ratio weights assigned to the individual ratios, the ratio vs. lens matrix, and the per-ratio and per-lens scores. This lens score analysis is the first step in understanding the Lens Model Score (item 1 in FIG. 9) for overperformance for the selected entity. This screen is used to identify which specific financial statement ratios or elements of analysis were the principal cause of the lens score. The lens score analysis provides an explanation of how the lens score was derived. The objective is to estimate the potential of fraudulent misreporting due to the overperformance of the eight ratios. Each lens analyzes different overperformance aspects of a ratio's value in movements over time and compared to the peer group.

Item 2 in FIG. 9 shows the lens weights and ratio weights. A ratio "triggers" a lens if the ratio value meets the overperformance rules of the lens. The importance of a ratio that triggers an overperformance lens is measured by the lens-ratio-weights combination. One or more of the AI models 108 and/or a unique overperformance AI model can determine the weights as described above. Item 3 in FIG. 9 shows an example of a lens being triggered. In this example, the ratio "Collection Ratio" (having a ratio weight of 0.5) triggers the "YoY String Decile" lens (having a lens weight of 0.5). The resulting score for that combination of ratio and lens is calculated by multiplying the ratio weight and the lens weight to obtain 0.025. When the ratio does not trigger the lens, the resulting score for that combination is 0. The Lens Model Score (item 1 in FIG. 9) is calculated as the sum of all values in the matrix and shown as a percentage.

Figure 10:
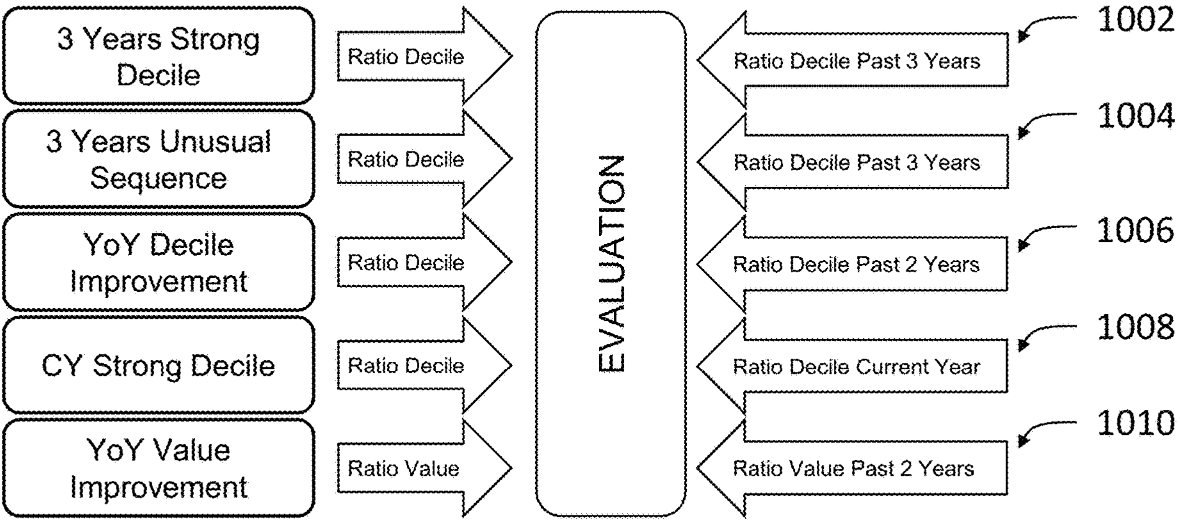
FIG. 10 illustrates how, using financial statement data and a series of analyses, the invention can calculate a final overperformance score indicating the potential that a target entity is committing fraud or has committed fraud within the scope of the data

As shown in FIG. 10, the invention looks for overperformance of the target entity as compared to its peer entities. For example, the invention can evaluate target entity ratio and decile values against peer ratio and decile values or against other target entity ratio or decile values, including as examples (i) a 3-year strong decile ratio value against peer ratio deciles 1002; (ii) a 3-year unusual ratio decile sequence evaluation against peer 3-year sequences 1004; (iii) a YoY decile improvement ratio against a past year ratio decile 1006, both for the target entity; (iv) a current year (CY) strong ratio decile against a different CY ratio decile 1008, both for the target entity; and/or (v) a year over year (YoY) value improvement ratio value against a past year ratio value 1010, both for the target entity. See Table 13 below for additional information of these ratios and comparisons.

TABLE 13

| Lens Name | Definition/Conditions |
| --- | --- |
| 3 Years Strong Decile | This lens triggers a red flag if the ratio value is in one of the 3 weakest peer group deciles for the last 3 years.<br>The 3 weak deciles (either [1, 2, 3] or [8, 9, 10]) are defined by the underperforming risk direction of the ratio.<br>$\text{Flag} = \begin{cases} 1, & \max(p_t, p_{t-1}, p_{t-2}) \geq 8 \\ 0, & \text{otherwise} \end{cases}$ if ratio risk direction is "lesser than"<br>$\text{Flag} = \begin{cases} 1, & \min(p_t, p_{t-1}, p_{t-2}) \leq 3 \\ 0, & \text{otherwise} \end{cases}$ if ratio risk direction is "greater than" |
| 3 Years Unusual Sequence | A ratio triggers this lens if the ratio has in the last 3 years a decile sequence that belongs to the 30% most unlikely in the peer group.<br>The deciles are categorized into strong, medium, and low.<br>If a ratio has a sequence that is common among its peers, the result will be:<br>The selected company has a decile sequence that belongs to the 70% most likely ones.<br>Sequence: Strong - Strong - Strong<br>If a ratio has a sequence that is uncommon among its peers, the result will be:<br>At least 70% of the companies have a sequence that is more usual than the selected one.<br>Sequence: Medium - Medium - Weak |
| YoY Decile Improvement | This lens triggers a red flag if the current ratio value improves by at least one peer group decile movement against its past year. The improvement direction is defined by the underperforming risk direction of the ratio. |

TABLE 13-continued

| Lens Name | Definition/Conditions |
| --- | --- |
| | $\text{Flag} = \begin{cases} 1, & p_t - p_{t-1} \geq -1 \\ 0, & \text{otherwise} \end{cases}$ if ratio risk direction is "lesser than" |
| | $\text{Flag} = \begin{cases} 1, & p_t - p_{t-1} \leq 1 \\ 0, & \text{otherwise} \end{cases}$ if ratio risk direction is "greater than" |
| CY Strong Decile | This lens triggers a red flag if the current year ratio value is in one of the three strongest peer group deciles. The three strong deciles (either [1, 2, 3] or [8, 9, 10]) are defined by the underperforming risk direction of the ratio. |
| | $\text{Flag} = \begin{cases} 1, & p_t \leq 8 \\ 0, & \text{otherwise} \end{cases}$ if ratio risk direction is "lesser than" |
| | $\text{Flag} = \begin{cases} 1, & p_t \geq 3 \\ 0, & \text{otherwise} \end{cases}$ if ratio risk direction is "greater than" |
| YoY Value Improvement | This lens triggers a red flag if the movement of the current year ratio value improves more than 10% against the ratio value in the previous year. The deteriorating direction is defined by the underperforming risk direction of the ratio. |
| | $\text{Flag} = \begin{cases} 1, & \frac{x_t - x_{t-1}}{\lvert x_{t-1} \rvert} \geq -10\% \\ 0, & \text{otherwise} \end{cases}$ if ratio risk direction is "lesser than" |
| | $\text{Flag} = \begin{cases} 1, & \frac{x_t - x_{t-1}}{\lvert x_{t-1} \rvert} \leq 10\% \\ 0, & \text{otherwise} \end{cases}$ if ratio risk direction is "greater than" |

Focus on Inconsistency

The above descriptions focus on company underperformance and overperformance against peers and how that can be indicative of fraud. This section will focus on inconsistency of company results against peers and how that can be indicative of fraud. Process steps that are common may or may not be described again, or the description may be abridged.

Figure 11:
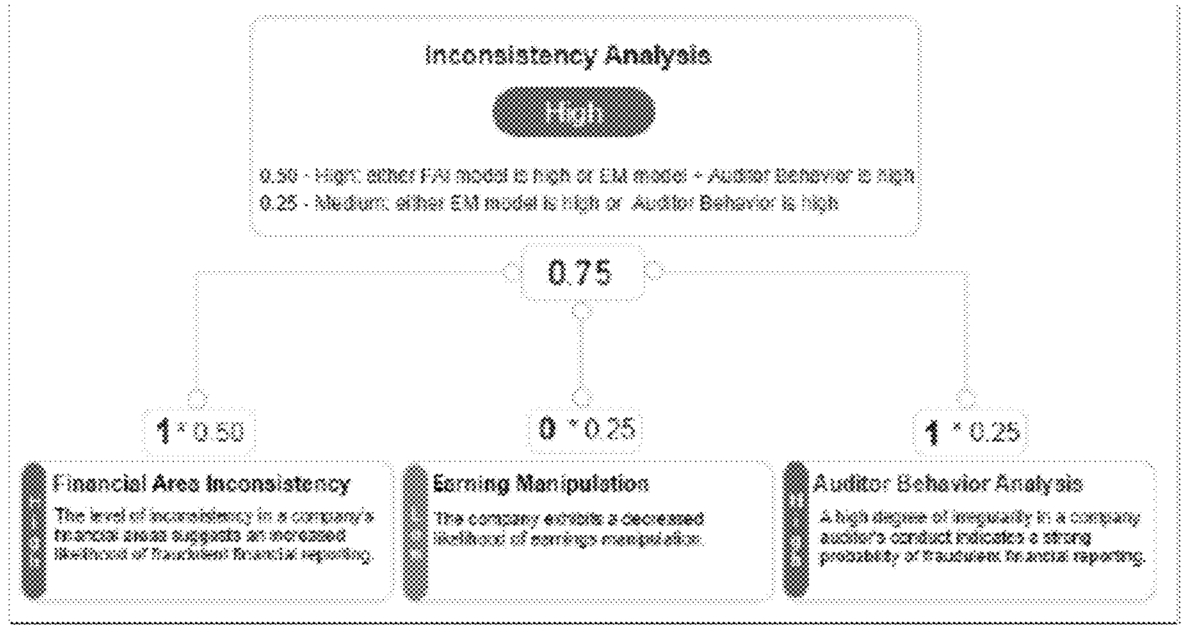
FIG. 11 illustrates the inconsistency meta model calculation.

FIG. 11 illustrates the inconsistency meta model calculation. By combining the results of three specific models—Financial Area Inconsistency, Earning Manipulation, and Auditor Behavior—the inconsistency meta model offers a panoramic view of potential financial inconsistencies. The meta model can be represented as shown in Equation 13 below:

$$\text{Meta Score} = \text{Financial Area Inconsistency} \times 0.5 + \text{Earning Manipulation} \times 0.25 + \text{Auditor Behavior} \times 0.25 \quad \text{Eq. 13}$$

The values of the individual models—Financial Area Inconsistency, Earning Manipulation, and Auditor Behavior—are binary. They take on the value of "1" if their respective results indicate a high risk, and "0" otherwise. These models, when indicating a high risk, can significantly impact the meta model's output. The overall score represents the potential risk of accounting fraud as shown in Table 14 below.

TABLE 14

| Category | Score Range | Meaning |
| --- | --- | --- |
| Low Score | <0.25 | Lower risk of accounting fraud |
| Medium Score | between 0.25 and 0.50 | Moderate risk of accounting fraud |
| High Score | ≥0.50 | High risk of accounting fraud |

The benefits of using an ensemble model as described in some embodiments include: (a) providing a more comprehensive overview; (b) higher efficiency-enabling analysts to conduct a quick assessment with still considerable accuracy; (c) enhanced reliability; (d) aggregation of insights from the three models enables the meta model to capture a broader spectrum of inconsistencies; (e) increased accuracy; (f) reduced bias due to the balancing of inherent biases in the different models; and (g) training efficiency. As shown below, the meta model in the inconsistency analysis uses multiple sub-models.

The first sub-model is a financial area inconsistency (FAI) model, which identifies potential fraudulent cases based on various financial areas' overperformance and underperformance probabilities. It processes financial ratios to detect patterns of fraud, utilizing a large dataset with instances of both fraud and non-fraud cases. The inconsistency analysis of FIG. 11 includes a score named "Financial Area Inconsistency" that indicates the financial health of a business. It is derived from five main areas: expenses, liability, revenue, cash, and assets.

Figure 13:
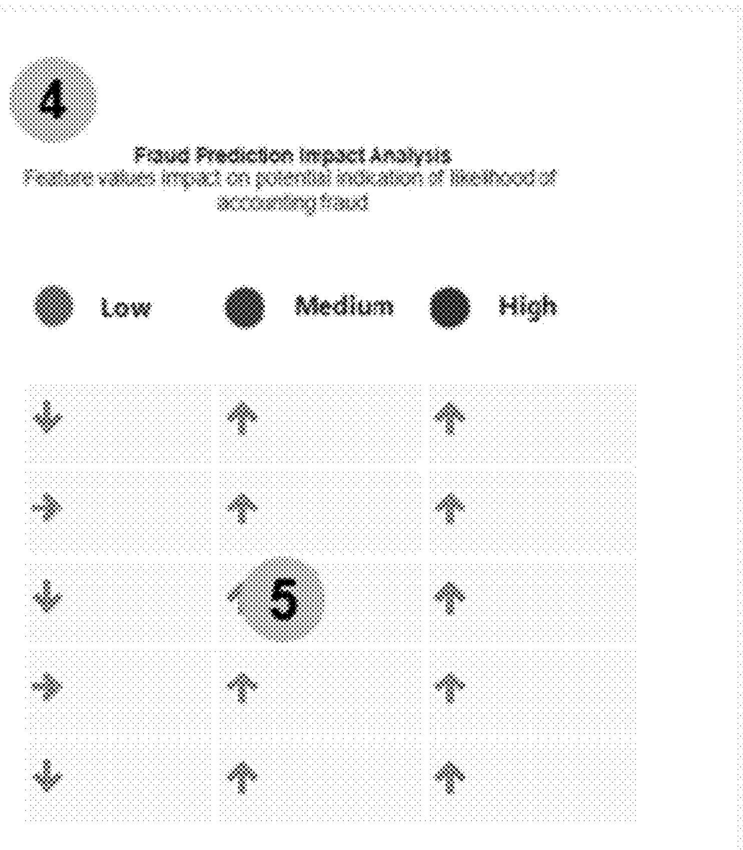
FIG. 13 illustrates how each FAI model feature influences the model's prediction.

FIG. 12 illustrates the score breakdown of the FAI model with each area playing a role in providing a holistic picture of an entity's financial standing. FIG. 13 is a graph illustrating how each feature influences the model's prediction. The arrows signal a positive, neutral, or negative impact on the final probability. On the other side, the dots show the feature value low medium high. The FAI model assesses the fraud related financial areas as shown in Table 15, the calculations of which are described above. For each of these areas, the AI model 108 uses a specialized 'lens model' to determine the degree of underperformance or overperformance, translating this into a probability value.

TABLE 15

| Financial Area | Financial Ratios |
|---|---|
| Assets | Assets Turnover, Age of Inventory, Collection Ratio, Quick Ratio, Total Liability over Total Assets, Working Capital to Total Assets |
| Cash | Operating Cashflow to Revenue, Quick Ratio |
| Expenses | Age of Inventory, Net Income Ratio |
| Liability | Quick Ratio, Total Liability over Total Assets |
| Revenue | Assets Turnover, Collection Ratio, Net Income Ratio, Operating Cashflow to Revenue |

The FAI model considers both underperformance and overperformance and presents a risk rating for misreporting (see item 2 in FIG. 12) for both of those scenarios for each financial area. These are calculated as described above. The FAI model also generates an FAI value (see item 3 in FIG. 12) by computing the mean risk between overperformance and underperformance for each financial area. More simply, the FAI value is a measurement of the extent to which each financial area contributes or detracts from the overall financial health of a business. After calculating the FAI values for the financial areas, the AI model 108 channels them into a separate AI model (not shown in the figures) that focuses on FAI data (see item 4 in FIG. 13). In one embodiment, this FAI AI model is an ensemble machine learning model, which uses an extra trees classifier algorithm and a Bernoulli NB algorithm to calculate an FAI score. However, other embodiments may use alternative types of AI models such as an LLM. The arrow graph (see item 5 in FIG. 13) illustrates how each feature influences the FAI AI model's prediction. The arrows signal a positive, neutral, or negative impact on the final probability of fraud.

Figure 14:
FIG. 14 illustrates an earnings manipulation model output and its predictions.

The inconsistency review process also uses an earning manipulation (EM) sub-model to detect potential earnings manipulation. An AI model (the EM AI model, not shown in the figures) uses eight features to predict the class of fraud or non-fraud directly. The EM AI model may be any suitable type of AI model including, but not limited to, a machine learning model or an LLM. FIG. 14 illustrates the EM model output and its predictions. The EM analysis incorporates several variables that are indicative of potential financial misconduct, including the following (shown at item 1 in FIG. 14).

Days Sales in Receivables Index (DSRI)
Gross Margin Index (GMI)
Asset Quality Index (AQI)
Sales Growth Index (SGI)
Depreciation Index (DEPI)
Sales and Marketing Expenses to Total Assets (SGAI)
Total Accruals to Total Assets (TATA)
Leverage Index (LVGI)

The EM AI model determines the risk of earnings manipulation by fiscal year by analyzing the trend, looking for spikes or drops, comparing with external events, and acting on insights. With respect to analyzing the trend, a line or bar graph represents the likelihood of earnings manipulation over time, with a rising trend indicating an increasing chance of earnings manipulation and a declining trend suggesting the opposite. With respect to looking for spikes or drops, such sudden changes in the chart can be red flags, representing abrupt changes in the likelihood and warranting a closer look into the reasons behind such movements. With respect to comparing to external events, cross-referencing the dates on the chart with company milestones or market events can provide context and might explain certain peaks or troughs in the likelihood. And with respect to acting on insights, finding consistently high likelihood percentages or notice concerning trends requires delving deeper into the financial statements or seeking expert consultation.

The core of the EM analysis is the ratio value per fiscal year, which is shown at item 3 of FIG. 14. These variables are derived from financial statement data and are used by the EM AI model to identify abnormal patterns or deviations that may indicate fraudulent financial reporting. The arrow graph (item 4 in FIG. 14) illustrates how each feature influences the EM analysis prediction. The arrows signal a positive, neutral, or negative impact on the final probability.

Figure 15:
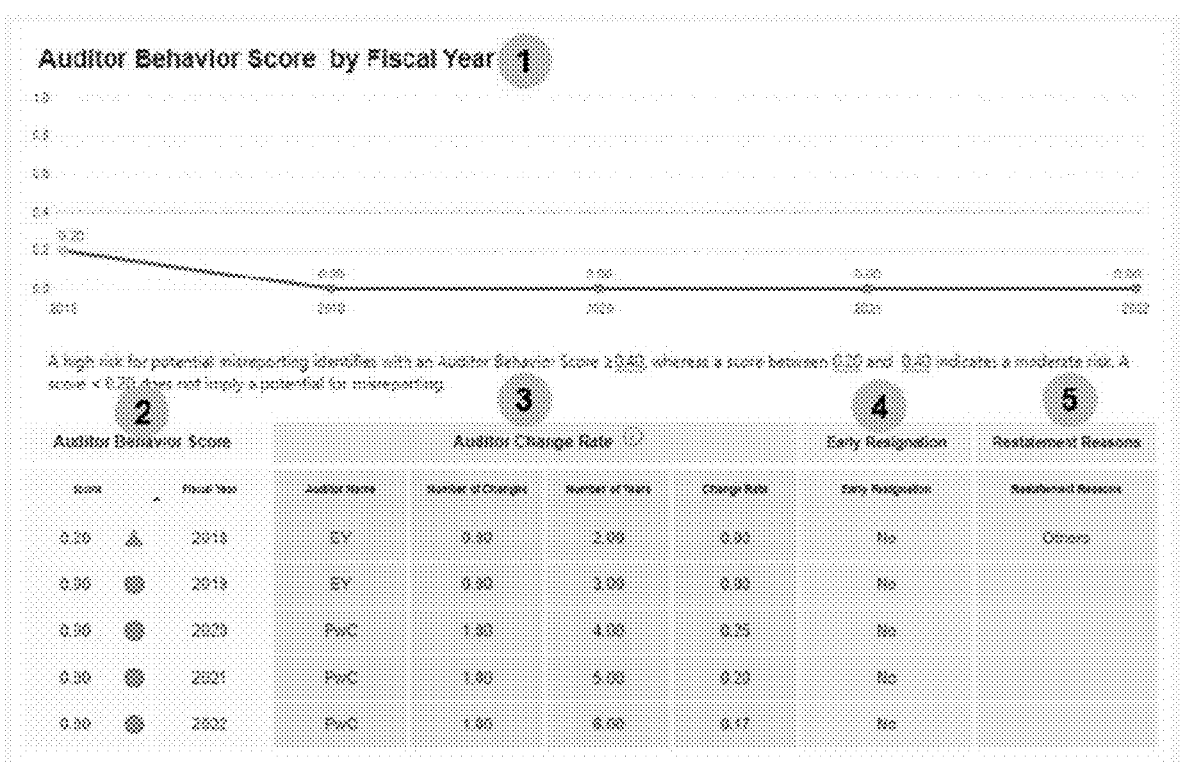
FIG. 15 illustrates the auditor behavior score component on the inconsistency model analysis.

A third sub-model of the inconsistency focus is the auditor behavior model. This analysis uses a linear model to analyze auditor behavior. It generates a score at time (t) based on a formula with three elements: Auditor Change Rate, Early Resignation, and Restatement Reasons. The more unusual auditor related events happened, the higher the risk for potential accounting fraud. More specifically, this analysis aims to scrutinize the behavior of auditors for potential red flags that may indicate accounting fraud. FIG. 15 illustrates the auditor behavior score component on the inconsistency model analysis.

Items 1 and 2 in FIG. 15 indicate the auditor behavior score by fiscal year, offering a trend for analysis and indication of sudden spikes or drops. Item 3 in FIG. 15 is an auditor change rate that indicates the frequency at which a business changes its auditor, which can be a telling sign. A high rate of auditor change may indicate potential disagreements or dissatisfaction between the auditor and the business, which may be due to observed discrepancies in financial reporting. The auditor change rate is calculated using Equation 14.

$$\text{Auditor Change Rate } (t) = \frac{\text{number of changes } (t)}{\text{number of years } (t)} \quad \text{Eq. 14}$$

Item 4 in FIG. 15 indicates whether an auditor has resigned before their term end or before completing an audit process for a given fiscal year. This could be due to the auditor discovering irregularities or being uncomfortable with the business' financial practices. This binary metric indicates an issue if an auditor has resigned before their tenure completion. Item 5 in FIG. 15 reflects restatement reasons. If a company frequently restates its financial statements, this could indicate potential issues. The reason for these restatements can provide insights into the potential risks. For instance, restatements due to honest mistakes may be less concerning than those due to fraudulent activities.

An AI model (AB AI model, not shown in the figures) aggregates the results from the above elements using a linear combination to generate a score at time (t). The AB AI model may be any suitable type of AI model including, but not limited to, a machine learning model or an LLM. The AB AI model uses the formula shown in Equation 15 below.

$$\text{Score } (t) = \omega_1 \times \sigma(\text{Auditor Change Rate } (t)) + \omega_2 \times \text{Early Resignation } (t) + \omega_3 \times \text{Restatement Reason } (t) \quad \text{Eq. 15}$$

where $\omega_1=0.4$, $\omega_2=0.4$, $\omega_3=0.2$ are weights representing the importance of each factor. In various embodiments, these weights are determined based on historical data and/or expert input, and where σ(Auditor Change Rate (t)) checks for an auditor change rate ≥0.5 and returns a "1" or else "0". The scores can be interpreted as follows: a low score (<0.20) indicates a low risk of accounting fraud, a medium score (between 0.20 and 0.40) indicates a moderate risk of accounting fraud, and a high score (≥0.40) indicates a high risk of accounting fraud.

Figure 16:
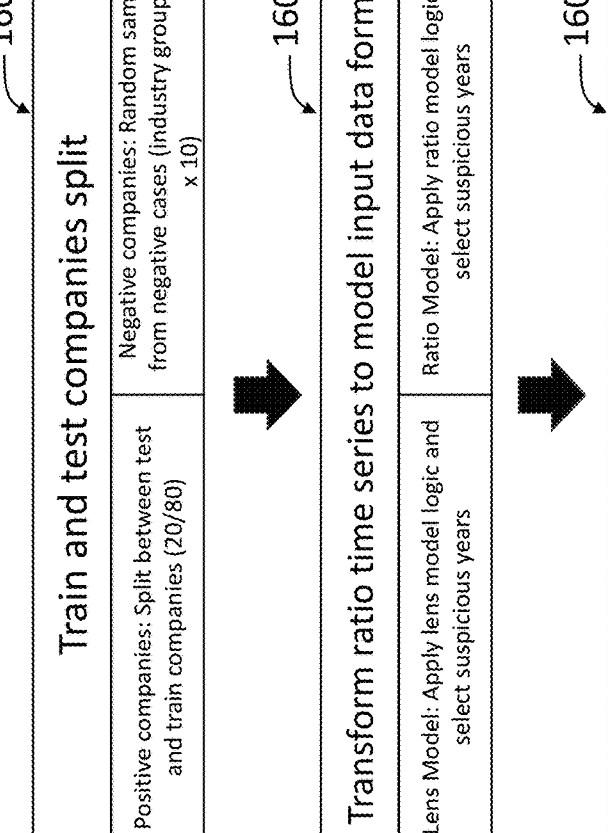
FIG. 16 is a flowchart illustrating an exemplary process of building an AI model training dataset and of training the AI model using the training dataset.
Figure 16:
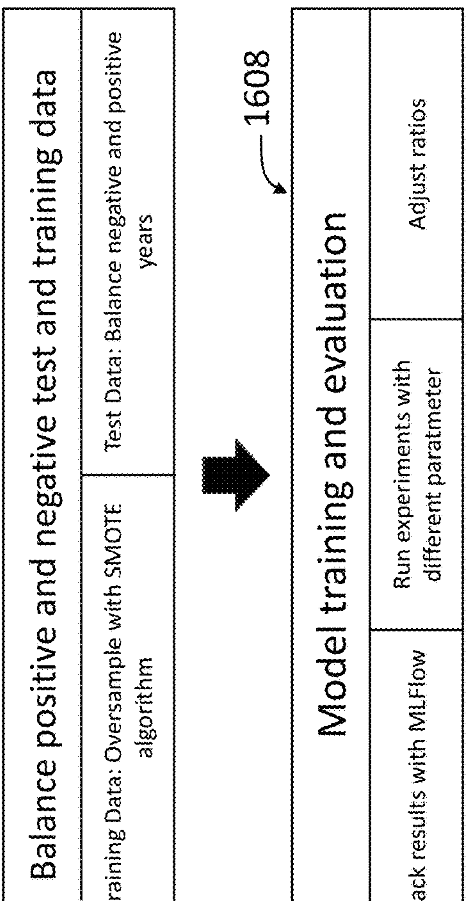

FIG. 16 is a flowchart illustrating an exemplary process of building an AI model training dataset and of training the AI model using the training dataset. FIGS. 16-19 illustrate the subprocesses of building the training dataset and using the dataset to train the AI model.

As shown in FIG. 16, step one 1602 is to split the dataset into training data and test data. Testing a model on the same data as it learned its parameters is a methodology mistake which is called overfitting. To avoid this, is it common practice to hold out a part of the data just for testing the model performance. As shown in FIG. 17, the objective for engineering the training data and test data is to (a) remove both positive and negative companies from the training data for use as testing data; (b) balance the classes within a certain industry group; and (c) balance between positive and negative learning examples.

Figure 18:
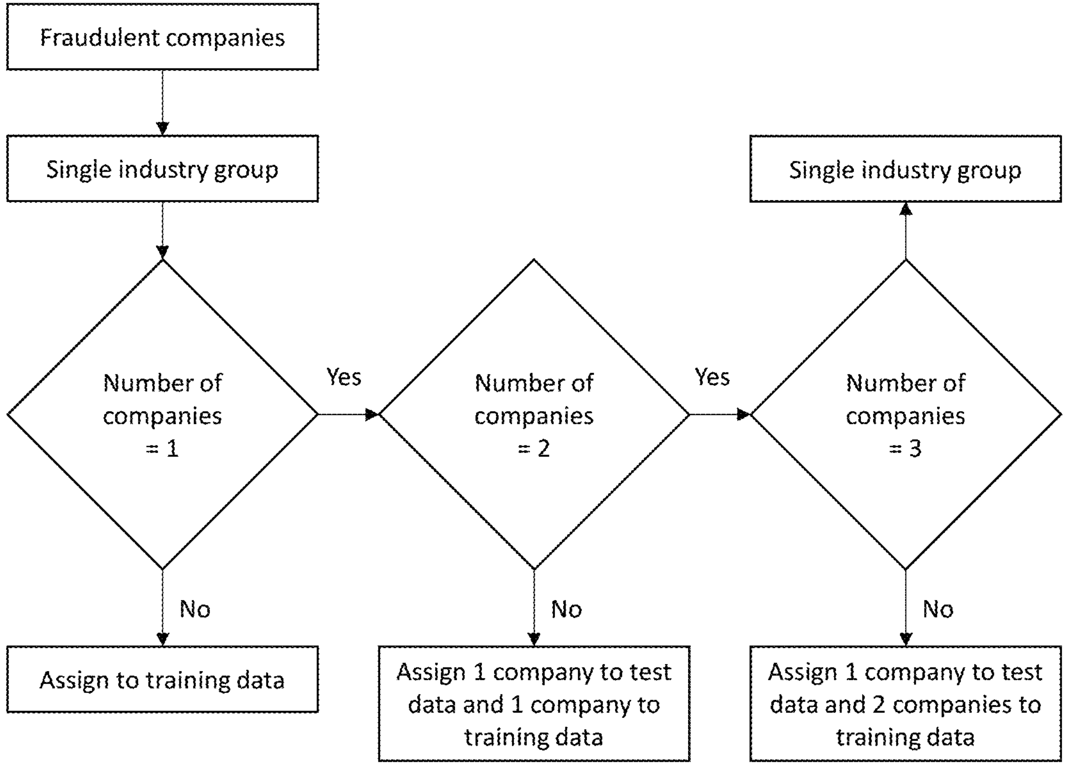
FIG. 18 is a flowchart illustrating a process of assigning companies to the testing dataset and to the training dataset.

Data is then collected on known fraudulent companies, for example from publicly available databases or third-party supplied datasets. The industry balance approach between test and train companies for fraudulent companies is shown in FIG. 18, which shows that for industry groups with more than three companies, 20% of the companies are assigned to be the test cases and 80% functioning as training examples. As the objective for the overall dataset is to have a balance between positive and negative companies in the industry groups, the testing data is enriched with negative cases per industry group by the factor of 1, whereas the training data is enriched with negative cases by the factor of 10.

Figure 19:
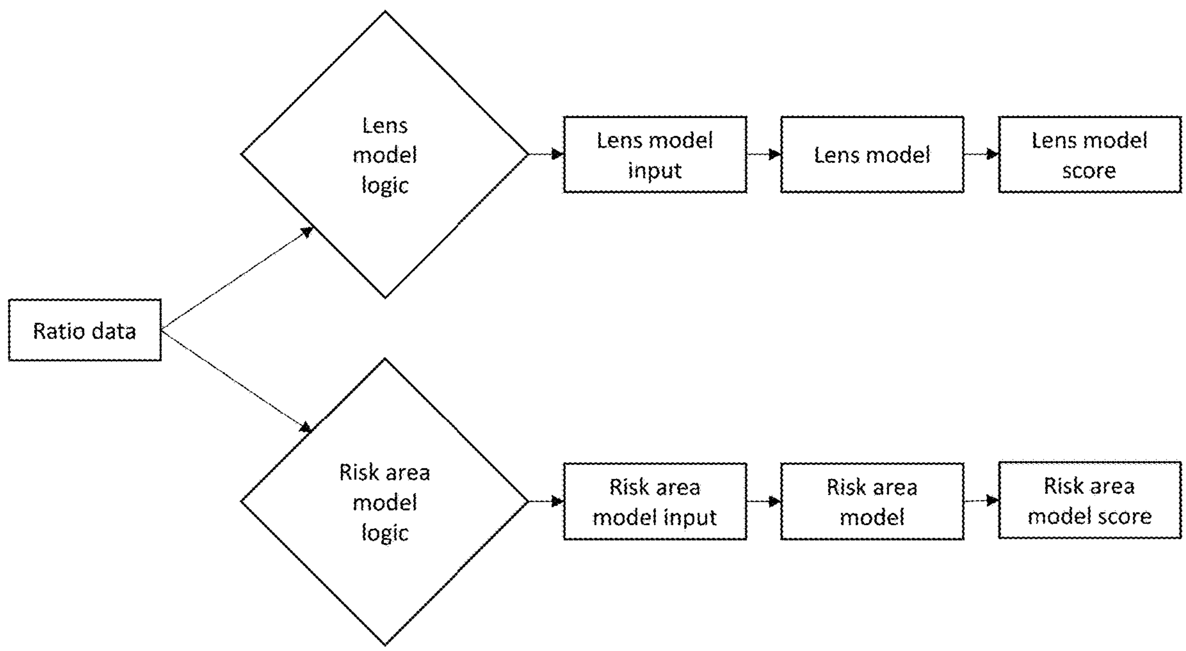
FIG. 19 is a flowchart illustrating a process of transforming ratio data into model input data for the purposes of training and testing one or more AI models.

In step two 1604 of the process of FIG. 16, ratio data is transformed into model input data and suspicious years are selected. More specifically, both models—the ratio model and the lens model—use the ratios time series data as input source. However, each model requires different data transformation steps on the ratios to receive the actual model input format, as shown in FIG. 19.

In step three 1606 of the process of FIG. 16, positive and negative data in the training data and testing data are balanced. To do this, the test data companies and training data companies providing the financial ratios are used as model input data. The goal is to build testing data and training data set based on the ratio time series data that has a balance in positive and negative cases. The learning phase and the subsequent prediction of machine learning algorithms can be affected by the problem of imbalanced data set. The balancing issue corresponds to the difference of the number of samples in the different classes. For positive cases, it is first necessary to infer the company's fraudulent years based on its suspended year. It is assumed that the three years prior to the suspended years are suspicious fraudulent years holding the relevant information the model should learn. This is just an approximation that leads to an assumption bias: if a company has less than the fraudulent financial statements years. In that case, it is sufficient to a assume the model will learn to detect the financial ratio performance issues prior to the fraudulent years. Table 16 below provides assumptions made to create year fraud tagging for each fraudulent company. Hence, the three suspicious years' financial ratio data from positive companies will serve as positive learning examples for both the training data and the test data.

TABLE 16

| | |
|---|---|
| Case 1 | If a company is suspended due to fraud before 1st May of the year, then it has fraud tag in the last four but one years.<br>Example: If a company is suspended on 1st January 2021-30th April 2021, then it has fraud tag in 2017, 2018 and 2019. |
| Case 2 | If a company is suspended due to fraud after 1st May of the year, then it has fraud tag in the last three years.<br>Example: If a company is suspended on 1st May 2021-31st December 2021, then it has fraud tag in 2018, 2019 and 2020. |

The negative cases in the training data are all extracted ratio time series data from all assigned negative training companies. This can lead to an imbalance in positive and negative cases within the training data as there are ten more negative companies providing ratio data as positive companies and three is up to seven years non-fraudulent ratio data whereas just three suspicious years fraudulent ratio data. Accordingly, a synthetic minority over-sampling technique algorithm can be applied to over sample the minority positive cases. The test data's negative cases are randomly sampled from the ratio data of the test companies with the same size as the positive ratio data.

In step four 1608 of the process of FIG. 16, the experiments for model training are tracked. AI model selection is determined mainly by optimizing the tradeoff between recall and precision. A model that exhibits high precision (or low false positive rate) can minimize costs by providing early warning signals that indicate the need for further investigation, while a model with high recall can enhance quality by minimizing the number of true suspicious cases that are overlooked. The evaluation of the models is conducted at two levels: suspicious years level and company level. Since the models are trained using three suspicious years of financial ratio data, the initial model output is a score that indicates the probability of having a suspicious year. Consequently, another evaluation is needed at the company level to determine the number of suspicious years that are predicted by the models for companies that are actually fraudulent. The testing data years that are selected are sampled from the test companies. The precision and recall measurements for predicting suspicious and non-suspicious years are dependent on the proportion of positive and negative cases in the test dataset. Therefore, a test dataset was created that has an equal number of known positive and negative cases.

In a final step, a threshold is selected for use with the selected AI model. For example, in machine learning models for fraud detection, a threshold is a value that is used to determine whether a predicted probability of fraud is classified as a positive or negative instance. Specifically, the threshold is the probability value above which the model considers a transaction, account, or entity to be classified as fraudulent, and below which it is classified as non-fraudulent. The choice of threshold value can significantly impact the performance of the model, and there is often a trade-off between the false positive rate and the false negative rate. For example, setting a higher threshold may result in fewer false positives but more false negatives, while setting a lower threshold may result in more false positives but fewer false negatives. The g-mean method is a technique that can be used to identify the optimal threshold value for a given model by maximizing the geometric mean of the true positive rate and the true negative rate. This method can help to balance the trade-off between false positives and false negatives and identify the threshold that results in the best overall performance of the model.

The methods, systems, and apparatuses described herein provide and enable businesses to evaluate other entities for whether the entities should be taken on as clients (e.g., as audit clients) or whether the entities are good targets for acquisition or investment. The embodiments described herein use supervised training of machine learning models (e.g., the lens model and risk area model) using historical fraud data and other financial information to generate a score that indicates the potential for fraudulent financial reporting by the entity. The embodiments described herein also provide a means for more efficiency, and based on much larger amounts of data than earlier solutions, indicating inconsistencies in company scores. Thus, these implementations and embodiments improve the speed and accuracy with which computers analyze entity financial and reporting data versus peers.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

The invention claimed is:

1. A computer-implemented method for calculating a score representative of the risk of fraud by a target entity, the method comprising, by one or more processors executing stored instructions:

- ingesting, from one or more data sources, financial statement data and regulatory reporting data associated with the target entity and with a plurality of peer entities;
- selecting the plurality of peer entities for comparison to the target entity by algorithmically identifying entities sharing at least one common industry classification and exceeding a minimum peer-count threshold, wherein selecting comprises:
  - determining whether a sub-industry of the target entity has at least the minimum peer-count threshold of peer entities and, if so, selecting the peer entities from the sub-industry;
  - otherwise, determining whether an industry of the target industry has at least the minimum peer-count threshold of peer entities and, if so, selecting the peer entities from the industry; and
  - otherwise selecting the peer entities from an industry-group of the target entity;
- performing a missing data treatment on gaps in financial statement data and regulatory reporting data related to the target entity by imputing values based on peer-group decile position;
- performing an outlier data treatment on the financial statement data or regulatory reporting data related to the target entity by excluding ratio values outside a predefined interquartile range threshold;
- calculating a plurality of financial ratios by transforming the financial statement data into normalized ratio values for the target entity and the peer entities;
- calculating a decile rank of the target entity for each financial ratio compared to the peer entities to generate the peer-relative representations of the normalized ratio values;
- calculating a plurality of lens model scores indicative of fraud risk for the target entity by applying a trained machine learning model to peer-relative representations, wherein the peer-relative representations include the decile ranks of the target entity for the financial ratios;
- calculating a plurality of risk area scores indicative of fraud risk for the target entity based on weighted combinations of the decile ranks of the normalized ratio values grouped into predefined financial risk categories;
- calculating one or more academic scores indicative of fraud risk for the target entity;
- storing, in a non-transitory memory, the lens model scores, risk area scores, and academic scores as structured fraud risk indicators for subsequent analysis; and
- displaying the lens model scores, risk area scores, and academic scores to a user to evaluate the overall fraud risk for the target entity.

2. The computer-implemented method of claim 1, further comprising:

- performing the missing data treatment prior to performing the outlier data treatment and wherein the missing data treatment comprises imputing missing financial ratio values based on peer-group decile positions; and
- performing the outlier data treatment comprises excluding ratio values outside a predefined interquartile range threshold prior to calculating the decile rank.

3. The computer-implemented method of claim 1, wherein calculating the decile rank comprises:

assigning the target entity a decile value between 1 and 10 for each financial ratio based on a peer group distribution; and adjusting the decile value based on a risk direction associated with the financial ratio such that a higher decile indicates greater fraud risk regardless of whether a higher or lower ratio value is indicative of risk.

4. The computer-implemented method of claim 1, wherein calculating the plurality of lens model scores comprises:

calculating a plurality of ratio weights;

calculating a plurality of lens weights by normalizing the ratio weights across multiple financial dimensions; and applying one or more computer-executed lens logic algorithms to the decile ranks to determine a fraud risk for each lens.

5. The computer-implemented method of claim 4, wherein applying the one or more lens logic algorithms comprises:

defining at least one threshold decile value associated with elevated fraud risk;

comparing the decile rank for each financial ratio to the threshold decile value; and generating a lens decision for each financial ratio indicative of fraud risk when the decile rank satisfies the threshold.

6. The computer-implemented method of claim 1, wherein calculating the plurality of risk area scores comprises:

grouping decile ranks for the target entity into predefined financial risk categories; and calculating each risk area score using a representative statistic of the grouped decile ranks.

7. The computer-implemented method of claim 1, wherein calculating one or more academic scores comprises calculating a Z-score for the target entity and for the peer entities and comparing the Z-score of the target entity to the Z-score of each peer entity.

8. The computer-implemented method of claim 1, wherein calculating one or more academic scores comprises calculating an O-score for the target entity and for the peer entities and comparing the O-score of the target entity to the O-score of each peer entity.

9. The computer-implemented method of claim 1, wherein displaying further comprises displaying a plurality of market performance data points associated with the target entity as additional fraud risk indicators.

10. An apparatus for determining the risk of fraud by a target entity, comprising:

one or more processors; and memory storing instructions that, when executed by the one or more processors, cause the apparatus to:

ingest financial statement data and regulatory reporting data associated with the target entity and with a plurality of peer entities;

select the plurality of peer entities for comparison to the target entity by algorithmically identifying entities sharing at least one common industry classification and exceeding a minimum peer-count threshold, wherein selecting comprises:

determining whether a sub-industry of the target entity has at least the minimum peer-count threshold of peer entities and, if so, selecting the peer entities from the sub-industry;

otherwise, determining whether an industry of the target entity has at least the minimum peer-count threshold of peer entities and, if so, selecting the peer entities from the industry; and otherwise selecting the peer entities from an industry-group of the target entity;

perform a missing data treatment on gaps in financial statement data and regulatory reporting data related to the target entity by imputing values based on peer-group decile positions;

perform an outlier data treatment on the financial data or regulatory reporting data related to the target entity by excluding ratio values outside a predefined interquartile range threshold;

calculate a plurality of financial ratios by transforming the financial statement data into normalized ratio values for the target entity and the peer entities;

calculate a decile rank of the target entity for each financial ratio compared to the peer entities to generate the peer-relative representations of the normalized ratio values;

calculate a plurality of lens model scores indicative of fraud risk by applying a trained machine learning model to peer-relative representations, wherein the peer-relative representations include the decile ranks of the target entity for the financial ratios;

calculate a plurality of risk area scores indicative of fraud risk based on weighted combinations of the decile ranks of the normalized ratio values grouped into predefined financial risk categories;

calculate one or more academic scores indicative of fraud risk for the target entity;

store the lens model scores, risk area scores, and academic scores in a non-transitory memory as structured fraud risk indicators; and display the lens model scores, risk area scores, and academic scores to a user.

11. The apparatus of claim 10, wherein the instructions further cause the apparatus to:

assign the target entity a decile value between 1 and 10 for each financial ratio based on a peer group distribution; and adjust the decile value based on a risk direction associated with the financial ratio such that a higher decile indicates greater fraud risk regardless of whether a higher or lower ratio value is indicative of risk.

12. The apparatus of claim 10, wherein the one or more academic scores include a Z- and an O-score for the target entity and for the peer entities, and wherein the instructions further cause the apparatus to compare the Z-score and the O-score of the target entity with those of the peer entities.

13. The apparatus of claim 10, wherein the instructions further cause the apparatus to:

calculate a plurality of ratio weights;

calculate a plurality of lens weights by normalizing the ratio weights; and determine a fraud risk for each lens by:

defining a threshold decile value associated with elevated fraud risk;

comparing a decile rank for a financial ratio to the threshold decile value; and generating a lens decision indicative of fraud risk when the decile rank satisfies the threshold decile value.

14. A non-transitory machine-readable medium storing instructions executable by one or more processors, the instructions causing the one or more processors to:

ingest financial statement data and regulatory reporting data associated with a target entity and with a plurality of peer entities;

select the plurality of peer entities for comparison to the target entity by algorithmically identifying entities sharing at least one common industry classification and exceeding a minimum peer-count threshold, wherein the selection includes:

determining whether a sub-industry of the target entity has at least the minimum peer-count threshold of peer entities and, if so, selecting the peer entities from the sub-industry;

otherwise, determining whether an industry of the target entity has at least the minimum peer-count threshold of peer entities and, if so, selecting the peer entities from the industry; and otherwise selecting the peer entities from an industry-group of the target entity;

perform a missing data treatment on gaps in financial statement data and regulatory reporting data related to the target entity by imputing values based on peer-group decile positions;

perform an outlier data treatment on the financial data or regulatory reporting data related to the target entity by excluding ratio values outside a predefined interquartile range threshold;

calculate a plurality of financial ratios by transforming the financial statement data into normalized ratio values for the target entity and the peer entities;

calculate a decile rank of the target entity for each financial ratio compared to the peer entities to generate peer-relative representations of the normalized ratio values;

calculate a plurality of lens model scores indicative of fraud risk by applying a trained machine learning model to peer-relative representations, wherein the peer-relative representations comprise the decile ranks of the target entity for the financial ratios;

calculate a plurality of risk area scores indicative of fraud risk based on weighted combinations of the decile ranks of the normalized ratio values grouped into predefined financial risk categories;

calculate one or more academic scores indicative of fraud risk for the target entity;

store the lens model scores, risk area scores, and academic scores as structured fraud risk indicators; and display the lens model scores, risk area scores, and academic scores to a user.

15. The non-transitory machine-readable medium of claim 14, wherein the one or more academic scores include a Z-score and an O-score for the target entity and for the peer entities, and wherein the instructions further cause the one or more processors to compare the Z-score and O-score of the target entity with those of the peer entities.

16. The non-transitory machine-readable medium of claim 14, wherein the instructions further cause the one or more processors to:

calculate a plurality of ratio weights;

calculate a plurality of lens weights by normalizing the ratio weights; and determine a fraud risk for each lens by:

defining a threshold decile value associated with elevated fraud risk;

comparing a decile rank for a financial ratio to the threshold decile value; and generating a lens decision indicative of fraud risk when the decile rank satisfies the threshold decile value.

* * * * *